US012752239B2

(12) United States Patent
Benton et al.

(10) Patent No.: US 12,752,239 B2
(45) **Date of Patent: *Oct. 6, 2026**

(54) METHODS OF DEWATERING OF ALCOHOLIC SOLUTIONS VIA FORWARD OSMOSIS AND RELATED SYSTEMS

(71) Applicant: Porifera, Inc., San Leandro, CA (US)

(72) Inventors: Charles Benton, Berkeley, CA (US); Olgica Bakajin, Berkeley, CA (US); Jennifer Klare, Berkeley, CA (US); Ravindra Revanur, Fremont, CA (US)

(73) Assignee: Porifera, Inc., San Leandro, CA (US)

( * ) Notice: Subject to any disclaimer, the term of this patent is extended or adjusted under 35 U.S.C. 154(b) by 649 days.

This patent is subject to a terminal disclaimer.

(21) Appl. No.: 18/165,162

(22) Filed: Feb. 6, 2023

(65) Prior Publication Data

US 2023/0182076 A1 Jun. 15, 2023

Related U.S. Application Data

(62) Division of application No. 15/739,657, filed as application No. PCT/US2016/039377 on Jun. 24, 2016, now Pat. No. 11,571,660.

(60) Provisional application No. 62/184,159, filed on Jun. 24, 2015.

(51) Int. Cl.

| | |
|---|---|
| ***B01D 61/00*** | (2006.01) |
| ***B01D 3/14*** | (2006.01) |
| ***B01D 61/02*** | (2006.01) |
| ***C12H 1/07*** | (2006.01) |
| ***C12H 3/04*** | (2019.01) |

(52) U.S. Cl.

CPC .......... *B01D 61/005* (2013.01); *B01D 3/145* (2013.01); *B01D 61/026* (2022.08); *C12H 1/063* (2013.01); *C12H 3/04* (2019.02); *B01D 61/025* (2013.01); *B01D 2311/2669* (2013.01)

(58) Field of Classification Search

CPC .... B01D 3/145; B01D 61/005; B01D 61/025; B01D 61/026; B01D 2311/2669; C12H 1/063; C12H 3/04

See application file for complete search history.

(56) References Cited

U.S. PATENT DOCUMENTS

| | | | |
|---|---|---|---|
| 2,116,920 | A | 5/1938 | Leonard |
| 3,216,930 | A | 11/1965 | Glew |
| 3,352,422 | A | 11/1967 | Goran |
| 3,721,621 | A | 3/1973 | Hough |

(Continued)

FOREIGN PATENT DOCUMENTS

| | | | |
|---|---|---|---|
| CA | 2785807 | A1 | 7/2011 |
| CN | 101228214 | A | 7/2008 |

(Continued)

OTHER PUBLICATIONS

Zhao, et al., "Modification of porous poly (vinylidene fluoride) membrane using amphiphilic polymers with different structures in phase inversion process", Journal of Membrane Science 310, Mar. 2008, 567-576.

(Continued)

*Primary Examiner* — Patrick Orme
(74) *Attorney, Agent, or Firm* — Dorsey & Whitney LLP

(57) ABSTRACT

Embodiments described herein relate to methods and systems for dewatering alcoholic solutions via forward osmosis.

20 Claims, 9 Drawing Sheets

(56) References Cited

U.S. PATENT DOCUMENTS

| | | | | |
|---|---|---|---|---|
| 4,326,509 | A | 4/1982 | Usukura | |
| 4,428,720 | A | 1/1984 | Van Erden et al. | |
| 4,454,176 | A | 6/1984 | Buckfelder et al. | |
| 4,618,533 | A | 10/1986 | Steuck | |
| 4,756,835 | A | 7/1988 | Wilson | |
| 4,778,688 | A * | 10/1988 | Matson | B01D 3/322 426/492 |
| 4,792,402 | A * | 12/1988 | Fricker | C12H 3/04 210/651 |
| 4,900,443 | A | 2/1990 | Wrasidlo | |
| 4,959,237 | A | 9/1990 | Walker | |
| 5,084,220 | A | 1/1992 | Moller | |
| 5,100,556 | A | 3/1992 | Nichols | |
| 5,192,434 | A | 3/1993 | Moller | |
| 5,238,574 | A | 8/1993 | Kawashima et al. | |
| 5,281,430 | A | 1/1994 | Herron et al. | |
| 5,593,738 | A | 1/1997 | Ihm et al. | |
| 5,635,071 | A | 6/1997 | Al-Samadi | |
| 6,261,879 | B1 | 7/2001 | Houston et al. | |
| 6,406,626 | B1 | 6/2002 | Murakami et al. | |
| 6,413,070 | B1 | 7/2002 | Meyering et al. | |
| 6,513,666 | B2 | 2/2003 | Meyering et al. | |
| 6,755,970 | B1 | 6/2004 | Knappe et al. | |
| 6,849,184 | B1 | 2/2005 | Lampi et al. | |
| 6,884,375 | B2 | 4/2005 | Wang et al. | |
| 6,992,051 | B2 | 1/2006 | Anderson | |
| 7,177,978 | B2 | 2/2007 | Kanekar et al. | |
| 7,205,069 | B2 | 4/2007 | Smalley et al. | |
| 7,445,712 | B2 | 11/2008 | Herron | |
| 7,611,628 | B1 | 11/2009 | Hinds, III | |
| 7,627,938 | B2 | 12/2009 | Kim et al. | |
| 7,799,221 | B1 | 9/2010 | Macharg | |
| 7,879,243 | B2 | 2/2011 | Al-Mayahi et al. | |
| 7,901,578 | B2 | 3/2011 | Pruet | |
| 7,955,506 | B2 | 6/2011 | Bryan et al. | |
| 8,029,671 | B2 | 10/2011 | Cath et al. | |
| 8,029,857 | B2 | 10/2011 | Hoek et al. | |
| 8,038,887 | B2 | 10/2011 | Bakajin et al. | |
| 8,083,942 | B2 | 12/2011 | Cath et al. | |
| 8,177,978 | B2 | 5/2012 | Kurth et al. | |
| 8,181,794 | B2 | 5/2012 | Mcginnis et al. | |
| 8,221,629 | B2 | 7/2012 | Al-Mayahi et al. | |
| 8,246,791 | B2 | 8/2012 | Mcginnis et al. | |
| 8,252,350 | B1 | 8/2012 | Cadwalader et al. | |
| 8,356,717 | B2 | 1/2013 | Waller, Jr. et al. | |
| 8,518,276 | B2 | 8/2013 | Stiemer et al. | |
| 8,567,612 | B2 | 10/2013 | Kurth et al. | |
| 8,920,654 | B2 | 12/2014 | Revanur et al. | |
| 8,960,449 | B2 | 2/2015 | Tomioka et al. | |
| 9,216,391 | B2 | 12/2015 | Revanur et al. | |
| 9,227,360 | B2 | 1/2016 | Lulevich et al. | |
| 9,636,635 | B2 | 5/2017 | Benton et al. | |
| 9,861,937 | B2 | 1/2018 | Benton et al. | |
| 11,090,611 | B2 | 8/2021 | Benton et al. | |
| 11,541,352 | B2 * | 1/2023 | Benton | C12H 6/00 |
| 11,571,660 | B2 * | 2/2023 | Benton | B01D 61/026 |
| 12,390,767 | B2 * | 8/2025 | Benton | C12G 3/08 |
| 2001/0006158 | A1 * | 7/2001 | Ho | A23L 2/38 210/644 |
| 2002/0063093 | A1 | 5/2002 | Rice et al. | |
| 2002/0148769 | A1 | 10/2002 | Deuschle et al. | |
| 2003/0038074 | A1 | 2/2003 | Patil | |
| 2003/0141250 | A1 | 7/2003 | Kihara et al. | |
| 2003/0173285 | A1 | 9/2003 | Schmidt et al. | |
| 2003/0205526 | A1 | 11/2003 | Vuong | |
| 2004/0004037 | A1 | 1/2004 | Herron | |
| 2004/0071951 | A1 | 4/2004 | Jin | |
| 2004/0084364 | A1 | 5/2004 | Kools | |
| 2005/0016922 | A1 | 1/2005 | Enzweiler et al. | |
| 2005/0056590 | A1 | 3/2005 | Baggott et al. | |
| 2005/0142385 | A1 | 6/2005 | Jin | |
| 2005/0166978 | A1 | 8/2005 | Brueckmann et al. | |
| 2006/0144789 | A1 | 7/2006 | Cath et al. | |
| 2006/0233694 | A1 | 10/2006 | Sandhu et al. | |
| 2007/0181473 | A1 | 8/2007 | Manth et al. | |
| 2007/0215544 | A1 | 9/2007 | Kando et al. | |
| 2007/0246426 | A1 | 10/2007 | Collins | |
| 2008/0017578 | A1 | 1/2008 | Childs et al. | |
| 2008/0149561 | A1 | 6/2008 | Chu et al. | |
| 2008/0210370 | A1 | 9/2008 | Smalley et al. | |
| 2008/0223795 | A1 | 9/2008 | Bakajin et al. | |
| 2008/0236804 | A1 | 10/2008 | Cola et al. | |
| 2008/0237126 | A1 | 10/2008 | Hoek et al. | |
| 2008/0290020 | A1 | 11/2008 | Marand et al. | |
| 2009/0078640 | A1 | 3/2009 | Chu et al. | |
| 2009/0214847 | A1 | 8/2009 | Maruyama et al. | |
| 2009/0250392 | A1 | 10/2009 | Thorsen et al. | |
| 2009/0272692 | A1 | 11/2009 | Kurth et al. | |
| 2009/0283475 | A1 | 11/2009 | Hylton et al. | |
| 2009/0308727 | A1 | 12/2009 | Kirts | |
| 2009/0321355 | A1 | 12/2009 | Ratto et al. | |
| 2010/0018921 | A1 | 1/2010 | Ruehr et al. | |
| 2010/0025330 | A1 | 2/2010 | Ratto et al. | |
| 2010/0032377 | A1 | 2/2010 | Wohlert | |
| 2010/0051538 | A1 | 3/2010 | Freeman et al. | |
| 2010/0059433 | A1 | 3/2010 | Freeman et al. | |
| 2010/0062156 | A1 | 3/2010 | Kurth et al. | |
| 2010/0140162 | A1 | 6/2010 | Jangbarwala | |
| 2010/0155333 | A1 | 6/2010 | Husain et al. | |
| 2010/0192575 | A1 | 8/2010 | Al-Mayahi et al. | |
| 2010/0206743 | A1 | 8/2010 | Sharif et al. | |
| 2010/0206811 | A1 | 8/2010 | Ng et al. | |
| 2010/0212319 | A1 | 8/2010 | Donovan | |
| 2010/0224550 | A1 | 9/2010 | Herron | |
| 2010/0224561 | A1 | 9/2010 | Marcin | |
| 2010/0297429 | A1 | 11/2010 | Wang et al. | |
| 2010/0320140 | A1 | 12/2010 | Nowak et al. | |
| 2010/0326833 | A1 | 12/2010 | Messalem et al. | |
| 2011/0017666 | A1 | 1/2011 | Cath et al. | |
| 2011/0036774 | A1 | 2/2011 | Mcginnis | |
| 2011/0057322 | A1 | 3/2011 | Matsunaga et al. | |
| 2011/0073540 | A1 | 3/2011 | Mcginnis et al. | |
| 2011/0132834 | A1 | 6/2011 | Tomioka et al. | |
| 2011/0133487 | A1 | 6/2011 | Oklejas, Jr. | |
| 2011/0155666 | A1 | 6/2011 | Prakash et al. | |
| 2011/0186506 | A1 | 8/2011 | Ratto et al. | |
| 2011/0198285 | A1 | 8/2011 | Wallace | |
| 2011/0203994 | A1 | 8/2011 | Mcginnis et al. | |
| 2011/0220574 | A1 | 9/2011 | Bakajin et al. | |
| 2011/0284456 | A1 | 11/2011 | Brozell et al. | |
| 2011/0311427 | A1 | 12/2011 | Hauge et al. | |
| 2012/0012511 | A1 | 1/2012 | Kim et al. | |
| 2012/0043274 | A1 | 2/2012 | Chi et al. | |
| 2012/0080378 | A1 | 4/2012 | Revanur et al. | |
| 2012/0080381 | A1 | 4/2012 | Wang et al. | |
| 2012/0103892 | A1 | 5/2012 | Beauchamp et al. | |
| 2012/0118743 | A1 | 5/2012 | Liang et al. | |
| 2012/0118826 | A1 | 5/2012 | Liberman et al. | |
| 2012/0118827 | A1 | 5/2012 | Chang et al. | |
| 2012/0132595 | A1 | 5/2012 | Bornia | |
| 2012/0152841 | A1 | 6/2012 | Vissing et al. | |
| 2012/0160753 | A1 | 6/2012 | Vora et al. | |
| 2012/0231535 | A1 | 9/2012 | Herron et al. | |
| 2012/0234758 | A1 | 9/2012 | Mcginnis et al. | |
| 2012/0241371 | A1 | 9/2012 | Revanur et al. | |
| 2012/0241373 | A1 | 9/2012 | Na et al. | |
| 2012/0251521 | A1 | 10/2012 | Rostro et al. | |
| 2012/0261321 | A1 | 10/2012 | Han et al. | |
| 2012/0267297 | A1 * | 10/2012 | Iyer | C02F 1/445 210/636 |
| 2012/0267306 | A1 | 10/2012 | Mcginnis et al. | |
| 2012/0273421 | A1 | 11/2012 | Perry et al. | |
| 2012/0298381 | A1 | 11/2012 | Taylor | |
| 2013/0001162 | A1 | 1/2013 | Yangali-Quintanilla et al. | |
| 2013/0095241 | A1 | 4/2013 | Lulevich et al. | |
| 2013/0105383 | A1 | 5/2013 | Tang et al. | |
| 2013/0126431 | A1 | 5/2013 | Henson et al. | |
| 2013/0203873 | A1 | 8/2013 | Linder et al. | |
| 2013/0220581 | A1 * | 8/2013 | Herron | B01D 61/0022 210/243 |
| 2013/0220927 | A1 * | 8/2013 | Moody | C02F 1/445 210/652 |
| 2014/0015159 | A1 | 1/2014 | Lazar et al. | |
| 2014/0175011 | A1 | 6/2014 | Benton et al. | |

(56) References Cited

U.S. PATENT DOCUMENTS

| | | | | |
|---|---|---|---|---|
| 2014/0302579 | A1 | 10/2014 | Boulanger et al. | |
| 2014/0319056 | A1* | 10/2014 | Fuchigami | B01D 61/0022 210/648 |
| 2015/0014232 | A1 | 1/2015 | Mcginnis et al. | |
| 2015/0014248 | A1 | 1/2015 | Herron et al. | |
| 2015/0064306 | A1* | 3/2015 | Tatera | C12G 1/02 426/14 |
| 2015/0273399 | A1 | 10/2015 | Roh et al. | |
| 2016/0002074 | A1 | 1/2016 | Benton et al. | |
| 2016/0038880 | A1 | 2/2016 | Benton et al. | |
| 2016/0136577 | A1 | 5/2016 | Mcgovern et al. | |
| 2016/0136578 | A1 | 5/2016 | Mcgovern et al. | |
| 2016/0136579 | A1 | 5/2016 | Mcgovern et al. | |
| 2016/0230133 | A1 | 8/2016 | Peterson et al. | |
| 2017/0121190 | A1 | 5/2017 | Ikuno | |
| 2017/0190650 | A1 | 7/2017 | Peterson et al. | |
| 2017/0197181 | A1 | 7/2017 | Benton et al. | |
| 2017/0232392 | A1 | 8/2017 | Desormeaux et al. | |
| 2017/0333847 | A1 | 11/2017 | Lulevich et al. | |
| 2018/0311618 | A1 | 11/2018 | Benton et al. | |
| 2020/0024557 | A1 | 1/2020 | Benton et al. | |
| 2020/0086274 | A1 | 3/2020 | Benton et al. | |
| 2020/0094193 | A1 | 3/2020 | Benton et al. | |
| 2021/0339201 | A1 | 11/2021 | Benton et al. | |
| 2023/0149853 | A1 | 5/2023 | Benton et al. | |

FOREIGN PATENT DOCUMENTS

| | | | | |
|---|---|---|---|---|
| CN | 102642894 | A | 8/2012 | |
| CN | 102674605 | A | 9/2012 | |
| CN | 105142762 | A | 12/2015 | |
| CN | 107922220 | A | 4/2018 | |
| EP | 1894612 | A1 | 3/2008 | |
| EP | 3181215 | A1 | 6/2017 | |
| FR | 2189091 | A1 | 1/1974 | |
| JP | S55149682 | A | 11/1980 | |
| JP | 59059213 | A | 4/1984 | |
| JP | S5959213 | A | 4/1984 | |
| JP | 62-140620 | A | 6/1987 | |
| JP | 2005-138028 | A | 6/2005 | |
| JP | 2010094641 | A | 4/2010 | |
| JP | 2012183492 | A | 9/2012 | |
| JP | 2013081922 | A | 5/2013 | |
| JP | 2013128874 | A | 7/2013 | |
| KR | 101144316 | B1 | 5/2012 | |
| KR | 101229482 | B1 | 2/2013 | |
| NO | 2009039467 | A1 | 3/2009 | |
| WO | 1993/010889 | | 6/1993 | |
| WO | 9413159 | A1 | 6/1994 | |
| WO | 9962623 | | 12/1999 | |
| WO | 0213955 | A1 | 2/2002 | |
| WO | 2006040175 | A1 | 4/2006 | |
| WO | 2008/137082 | A1 | 11/2008 | |
| WO | 2009/035415 | | 3/2009 | |
| WO | 2009104214 | A1 | 8/2009 | |
| WO | 2009129354 | A2 | 10/2009 | |
| WO | 2009129354 | A3 | 10/2009 | |
| WO | 2010006196 | A2 | 1/2010 | |
| WO | 2010050421 | A1 | 5/2010 | |
| WO | 2010067063 | A1 | 6/2010 | |
| WO | 2010067065 | A1 | 6/2010 | |
| WO | 2010144057 | A1 | 12/2010 | |
| WO | 2011028541 | A1 | 3/2011 | |
| WO | 2011155338 | A1 | 12/2011 | |
| WO | 2012/047282 | | 4/2012 | |
| WO | 2012/084960 | | 6/2012 | |
| WO | 2012095506 | A1 | 7/2012 | |
| WO | 2012102677 | A1 | 8/2012 | |
| WO | 2012/135065 | | 10/2012 | |
| WO | 2013/022945 | A2 | 2/2013 | |
| WO | 2013032742 | A1 | 3/2013 | |
| WO | 2013/059314 | | 4/2013 | |
| WO | 2014063149 | A1 | 4/2014 | |
| WO | 2014/071238 | A1 | 5/2014 | |
| WO | 2014100766 | A2 | 6/2014 | |
| WO | 2014144704 | A1 | 9/2014 | |
| WO | WO2014144778 | | 9/2014 | |
| WO | WO-2014144778 | A1 * | 9/2014 | C02F 1/441 |
| WO | 2015157818 | A1 | 10/2015 | |
| WO | 2016022954 | A1 | 2/2016 | |
| WO | 2016070103 | A1 | 5/2016 | |
| WO | 2016094835 | A1 | 6/2016 | |
| WO | 2016210337 | A2 | 12/2016 | |
| WO | 2016210337 | A3 | 12/2016 | |
| WO | 2018119460 | A1 | 6/2018 | |
| WO | 2018200538 | A1 | 11/2018 | |
| WO | 2019113335 | A1 | 6/2019 | |
| WO | 2022060747 | | 3/2022 | |

OTHER PUBLICATIONS

[Published as US-2021-0339201-A1] U.S. Appl. No. 17/375,932 titled "Separation Systems, Elements, and Methods for Separation Utilizing Stacked Membranes and Spacers" filed Jul. 14, 2021.

App. No. PCT/US17/68345, "Removing Components of Alcoholic Solutions via Forward Osmosis and Related Systems"; filed on Dec. 22, 2017.

English translation of Examination Report for IN Application No. 201817001260, dated Mar. 6, 2020.

English translation of Office Action for BR Application No. 1120150147763, mailed Apr. 8, 2021.

English translation of Office Action for CN Application No. 201680045242, dated Apr. 8, 2021.

English translation of Office Action for CN Application No. 201680045242.X, dated Jul. 15, 2020.

English translation of Office Action for CN Application No. 201780086041.9, mailed May 8, 2021.

Extended European Search Report for EP Application No. 16815432.6 dated Dec. 19, 2018.

Extended European Search Report for EP Application No. 17882858.8 dated Aug. 17, 2020.

Office Action dated Jul. 27, 2020 for EP Application No. 13865011.4.

Office Action for AU Application No. 2016283127, dated Nov. 20, 2020.

Office Action for EP Application No. 14764413.2, dated Mar. 9, 2021.

PCT Application PCT/US21/50330 titled "Methods and Systems for Concentrating Acetic Acid Solutions With a Multi-Tier, Ultrahigh Pressure Reverse Osmosis" filed Sep. 14, 2021.

Summary of First Office Action dated Jul. 8, 2019 for Chilean Patent Application No. 201703297, 10 pages.

U.S. Appl. No. 16/473,088 titled "Methods of Dewatering of Alcoholic Solutions via Forward Osmosis and Related Systems" filed Dec. 22, 2017.

"English Translation of Office Action for CN 201780086041.9, mailed Jan. 6, 2022".

"English translation of Office Action for CN Application No. 201680045242.X, dated Sep. 2, 2021".

"English Translation of Office Action mailed Jul. 13, 2022 for CL Appl. No. 3297-2017".

"Examination Report for AU Patent App. No. 2021204374, mailed on Apr. 21, 2022".

"Examination Report for EP 13865011.4, mailed on Dec. 6, 2022".

"Examination Report for EP 17882858.8, issued on Oct. 25, 2021".

"Guide to Forward Osmosis Membranes", ForwardOsmosisTech, https://www.forwardosmosistech.com/forward-osmosis-membranes/ (last visited Aug. 19, 2020)., 2020, 1-6.

"Hydranautics—A NITTO Group Company, "Pro Series—Specialty Membrane Products for Challenging Industrial Wastewaters"", Pro-Series-Brochure (published online: May 18, 2020); pp. 1-4 (p. 2, col. 2, paragraph 2); URL: https://membranes.com/wp-content/uploads/Documents/brochure/PRO/PRO-Series-Brochure_web.pdf, May 18, 2020.

"International Search Report and Written Opinion for PCT/US2021/050330, mailed Dec. 29, 2021".

(56) References Cited

OTHER PUBLICATIONS

"International Search Report and Written Opinion received for PCT Appl. No. PCT/US2016/039377 dated Jan. 19, 2017".
"Osmotic Pressure and Solutions", Center for Student Success and Academic Counseling, The University of North Carolina at Chapel Hill, http://cssac.unc.edu/programs/learning-center/Resources/Study/Guides/Chemistry%20102/Osmotic%20Pressure, accessed Jan. 20, 2021.
"Summany of Office Action mailed Jul. 8, 2019, for CL3297-2017".
"Summons to Attend Oral Proceedings for EP 16815432.6, mailed Jul. 9, 2021".
"Translation for Rejection Decision, mailed Jun. 28, 2022, for CN 201780086041.9".
Akthakul, et al., "Antifouling polymer membranes with subnanometer size selectivity", Macromolecules 37, Sep. 3, 2004, 7663-7668.
Blandin , et al., "Validation of assisted forward osmosis (AFO) process: Impact of hydraulic pressure", Journal of Membrane Science vol. 447, pp. 1-11, Jun. 2013.
Cath , et al., "Forward osmosis: principles, applications and recent developments", Journal of Membrane Science 281, May 31, 2006, 70-87.
Chen , et al., Influences of molecular weight, molecular size, flux, and recovery for aromatic pesticide removal by hanofiltration membranes, Jan. 2004, Desalination 160, pp. 103-111.
Ge, Qingchun , et al., "Draw Solutions for Forward Osmosis Processes: Developments, Challenges, and Prospects for the Future", Journal of Membrane Science, vol. 442, issued Apr. 6, 2013, pp. 225-237.
Israel Patent Office , "Office Action", Application No. 264433, Aug. 25, 2019, 4 pages.
Li , et al., "Electronic properties of multiwalled carbon nanotubes in an embedded vertical array", Applied Physics Letters vol. 81, No. 5, Jul. 2002, 910-912.
Low , et al., ""Challenges in membrane-based liquid phase separations"", Green Chemical Engineering, vol. 2, Issue 1 (Mar. 2021), pp. 3-13.
Mandal , et al., "Drug delivery system based on chronobiology—a review", Journal of Controlled Release 147, Aug. 4, 2010, 314-325.
McCutcheon , et al., "Influence of membrane support layer hydrophobicity on water flux in osmotically driven membrane processes", Journal of Membrane Science, Mar. 2008, 458-466.
McEuen Paul, et al., "Single-Walled Nanotubes Electronics", IEEE Transactions on Nanotechnology, Vo.1, No. 1, Mar. 2002.
Qingchun, GE , et al., "Draw solutions for forward osmosis processes: Developments, challenges, and prospects for the future", Journal of Membrane Science, vol. 442, Sep. 1, 2013, pp. 225-237.
Santus , et al., "Osmotic drug delivery: a review of the patent literature", Journal of Controlled Release 35, Jul. 1995, 1-21.
Shon, Ho Kyong, et al., "Introduction: Role of Membrane Science and Technology and Forward Osmosis Processes", https://app.knovel.com/hotlink/toc/id:kpFOFA0001/forward-osmosis-fundamentals/forward-osmosis-fundamentals, 2015, pp. 1, 5-6.
Sotthivirat , et al., "Controlled porosity-osmotic pump pellets of a poorly water-soluble drug using sulfobutylether-p-cyclodestrin, (SBE)_7M-b-CD, as a solubilizing and osmotic agent", Journal of Pharmaceutical Sciences vol. 96, No. 9, Sep. 2007, 2364-2374.
Yip, Nagai Yin, et al., "High Performance Thin-Film Composite Forward Osmosis Membrane", Environmental Science & Technology, vol. 44, No. 10, 2010, Apr. 21, 2010, 3812-3818.
"Office Action for CA Appl. No. 3,048,017, mailed on Jan. 30, 2024 p. all".

* cited by examiner

METHODS OF DEWATERING OF ALCOHOLIC SOLUTIONS VIA FORWARD OSMOSIS AND RELATED SYSTEMS

CROSS-REFERENCE TO RELATED APPLICATIONS

This application is a divisional application of U.S. application Ser. No. 15/739,657, filed Dec. 22, 2017, which is a 371 national phase filing of PCT Application No. PCT/US2016/039377, filed Jun. 24, 2016, which claims the benefit under 35 U.S.C. § 119 of the earlier filing date of U.S. Application No. 62/184,159, filed Jun. 24, 2015. The entire contents of the afore-mentioned priority application are hereby incorporated by reference in their entirety for any purpose.

BACKGROUND

Existing techniques for dewatering alcoholic solutions include both thermal processes (e.g., distillation, evaporation), and hydrostatic pressure-driven membrane processes (e.g., reverse osmosis, nanofiltration, ultrafiltration). Thermal processes may be disadvantageous for concentration of alcoholic solutions because of high energy consumption, loss of volatile organic compounds (VOCs), and modification to protein structures important to flavor, aroma, and taste. Pressure driven membrane processes may be limited by poor retention of alcohol and VOCs, and hydrostatic pressure limits.

SUMMARY

Methods of dewatering a solution are disclosed. An example method includes introducing feed solution having one or more permeable solutes into a first side of a forward osmosis system. The example method includes circulating a draw solution having one or more permeable solutes therein through a second side of the forward osmosis system, the draw solution having permeable solute concentration greater than or equal to at least one species of the one or more permeable solutes in the feed solution. The example method includes generating a diluted draw solution in the second side of the forward osmosis system, the diluted draw solution having a higher water concentration than the draw solution. The example method includes producing a product stream including a concentrated feed solution from the first side of the forward osmosis system, the concentrated feed solution having a higher concentration of the at least one species of the one or more permeable solutes than the feed solution.

Methods of dewatering an alcoholic beverage using forward osmosis are disclosed. An example method includes introducing an alcoholic beverage into a first side of a forward osmosis system. The example method includes circulating a draw solution in a second side of the forward osmosis system, the draw solution having an alcohol concentration greater than or equal to the alcoholic beverage. The example method includes generating a diluted draw solution in the second side of the forward osmosis system, the diluted draw solution having a higher water concentration than the draw solution. The example method includes producing a product stream including a concentrated alcoholic beverage from the first side of the forward osmosis system. The example method includes regenerating the draw solution from the diluted draw solution. The example method further includes producing a permeate stream from the diluted draw solution.

Systems for dewatering an alcoholic solution are disclosed. An example system includes a forward osmosis element including at least one selectively permeable forward osmosis membrane separating a first side of the forward osmosis element from a second side of the forward osmosis element. The example system includes an alcohol solution in the first side. The example system includes a draw solution in the second side, the draw solution having a higher alcohol weight percentage than the alcohol solution.

Methods of dewatering a solution are disclosed. An example method includes introducing a feed solution having one or more permeable solutes into a first side of a forward osmosis system. The example method includes circulating a draw solution having one or more permeable solutes and one or more impermeable solutes therein through a second side of the forward osmosis system. The example method includes generating a diluted draw solution in the second side of the forward osmosis system, the diluted draw solution having a higher water concentration than the draw solution. The example method includes producing a product stream including a concentrated feed solution from the first side of the forward osmosis system, the concentrated feed solution having a desired concentration of the at least one species of the one or more permeable solutes; wherein a combined osmotic pressure of the one or more permeable solutes and the one or more impermeable solutes in the draw solution is greater than an osmotic pressure of the concentrated feed solution Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

For better understanding, the like elements have been designated by like reference numbers throughout the various accompanying figures. Understanding that these drawings depict only embodiments of the invention and are not therefore to be considered to be limiting of its scope, embodiments of the invention will be described and explained with additional specificity and detail through the use of the accompanying drawings in which.

Figure 1:
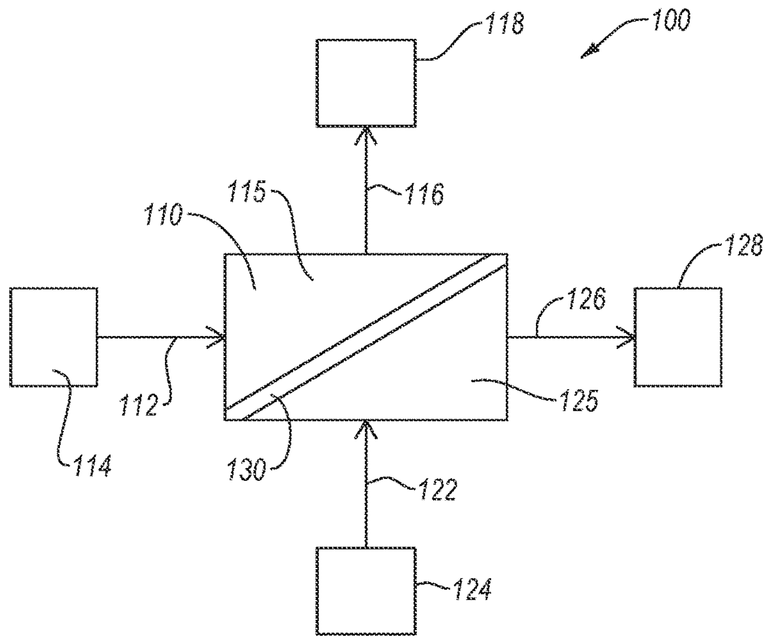
FIG. 1 is a block diagram of a co-current forward osmosis system for removing one or more components from solutions, according to examples described herein.

all arranged in accordance with at least some embodiments of the present disclosure.

DETAILED DESCRIPTION

Embodiments described herein relate to methods for removing water from solutions having one or more permeable solutes therein using forward osmosis (FO), and systems for the same. One or more solutes (e.g., dissolved, dispersed, or suspended components of a solvent system) can be selectively separated from one or more solvents using FO. The one or more solutes can include at least partially dissolved, dispersed, or suspended sugar(s), alcohol(s), volatile organic compounds (VOCs), proteins, salt(s), sugar alcohol(s), or other components of liquid systems that are capable of filtration (e.g., retention or removal) at a filtration membrane via FO, or combinations of any of the foregoing. Solutes may include permeable solutes that are capable of crossing the FO membrane, such as ethanol, methanol, ethylene glycol, etc. Solutes may include impermeable solutes that are substantially incapable of crossing the FO membrane (excepting negligible amounts of flux), such as sodium chloride, magnesium chloride, magnesium sulfate, glycerol, fructose, glucose, sucrose, polyethylene glycol, etc.

In example methods and systems disclosed herein, a first solution (e.g., feed solution) having a lower concentration of one or more permeable solutes is passed along a first side of a semipermeable membrane while a second solution (e.g., draw solution) of a higher osmotic pressure (e.g., higher concentration of the one or more permeable solutes) is passed along a second side of the semipermeable membrane. One or more solvents (e.g., water) and/or permeable solutes (e.g., methanol, ethanol, ethylene glycol, lithium, lactic acid, acetic acid, citric acid, boron and boron oxides, ammonia etc.) are drawn from the feed solution into the draw solution, while one or more impermeable solutes (e.g., solutes that are substantially incapable of passing through the FO membrane (except in negligible amounts), such as proteins, flavor compounds, glucose, sucrose, fructose, glycerol, etc.) are selectively retained, thereby concentrating the feed solution while diluting the draw solution. While it is understood that permeability of a material is dependent upon membrane materials relative to the specific material, as used herein, the terms "permeable" and "impermeable" refer to the permeability of specific solutes across an FO membrane (ignoring permeability of the same solutes relative to RO membranes). In some embodiments, the impermeable solutes could constitute matter that is concentrated in the feed solution to produce feed concentrate. In some embodiments, the impermeable solutes present in the draw solution can provide the driving force (osmotic pressure differential) for the concentration process. The retention by the semipermeable membrane of one or more impermeable solutes may be 99% or higher, or 95% or higher, or 90% or higher and may be specific for that particular membrane and solute combination and may be affected by operating conditions such as temperature, flux, etc. The retention by the semipermeable membrane of one or more permeable solutes may be less than 99%, or may be less than 95%, or 90% or less and may be specific for that particular membrane and solute combination and may be affected by operating conditions such as temperature, flux, etc. The net flux of one or more permeable solutes and/or impermeable solutes across the FO membranes herein may be zero (e.g., some positive or negative fluxes are balance out across the entirety of the FO membrane). This process may be carried out with both feed and draw solutions at common, atmospheric pressures. Specific permeable and/or impermeable solutes may be preferentially rejected by the FO membrane similar to reverse osmosis (RO).

When concentrating feed streams having multiple components (e.g., water, ethanol, carbohydrates, etc.) by forward osmosis, retention of one component (e.g., ethanol) versus the other (e.g., carbohydrates) may be poor (e.g., less than 70%). By adding one or more specific components (e.g., permeable solute(s) such as ethanol and/or impermeable solute(s) such as glycerol, sucrose, etc.) selected from the multiple components (e.g., ethanol, ethylene glycol, glycerol, sucrose, etc.) to the draw solution, the separation systems herein may retain one or more specific components (e.g., ethanol) in the feed stream while at least some of the other components or solvent(s) (e.g., water) in the feed are at least partially removed (e.g., dewatering). Methods of reconstituting the dewatered alcoholic solutions present in the draw solutions that leverage various pressure driven membrane and distillation processes are also disclosed herein.

Examples of methods and systems disclosed herein utilize forward osmosis for separation of liquids. Forward osmosis (FO) generally refers to the process of transporting liquids (e.g., water) across a semipermeable membrane while rejecting a solute. The FO process dewaters (e.g., concentrates) feed streams using a semipermeable membrane and a draw stream having a higher concentration of one or more components in the feed stream to provide higher osmotic pressure. The driving force in FO, the transfer of at least one liquid and/or solute component (e.g., water) from the feed stream to the draw stream, is osmotic pressure difference(s) generated from chemical potential of the two streams, unlike typical hydrostatic pressure-driven membrane processes. Example methods and systems disclosed can be specifically used for dewatering alcoholic solutions. Dewatering generally refers to the removal of water from a material (e.g., a solid or another (aqueous) solution). Separation systems including FO elements may be used to treat solutions (e.g., aqueous solutions having ethanol therein), which can include alcoholic beverages. Generally, any solution (e.g., a liquid containing water, alcohol, and one or more other permeable solutes) may be dewatered using the systems and methods described herein. The alcohol included in the feed solutions (e.g., alcoholic solutions) may generally be any alcohol, such as ethanol, methanol, etc. Example (alcoholic) solutions may include beer, malt beverages, distilled liquors, a fermentation broth (e.g., for ethanol production), flavor extraction(s), dye extraction(s), wine, or combinations thereof.

While certain solutions, distillates, permeates, concentrates, products, etc., are described as "streams" herein, it is understood that the "streams" may contain said solutions, distillates, permeates, concentrates, products, etc. The term "stream(s)" as used herein is intended to include the meaning of a flow or volume of a solution and is not intended to require that the stream has a constant flow.

Example FO systems and methods disclosed herein allow solutions to be dewatered at ambient pressures and temperatures while allowing selective retention of permeable solute(s) such as alcohol(s), volatile organic compounds (VOCs), sugar(s), etc. Advantageously, the dewatered solution may be transported and shipped in a manner that may be more efficient than transporting and/or shipping the fully hydrated solution. The dewatered solution may then be reconstituted prior to consumption. In this manner, for example, beer may be dewatered to form a dewatered beer solution and may be packaged and shipped in the dewatered form. On receipt, a consumer (or retail outlet) may reconstitute the dewatered beer solution for consumption. The dewatered beer solution may be reconstituted by the addition of carbonated water or by the consumer or a beverage machine. Example systems and methods described herein may advantageously employ FO to conduct the dewatering, which may improve flavor retention in the dewatered solution, such that the reconstituted solution (e.g., reconstituted dewatered beer solution) retains a flavor identical or similar to that of the original solution prior to dewatering. Accordingly, the FO systems and techniques disclosed herein may dewater an alcoholic solution without significantly altering or degrading the nutrients or components of the product stream or the flavor(s) of the alcoholic beverage (e.g., when reconstituted). Benefits of concentrating (e.g., dewatering) said solutions may include reduced transportation costs, reduced loss of VOCs, increased stability and shelf life, and the manufacture of a unique consumer product (e.g., a dewatered alcoholic beverage).

Benefits and advantages of examples described herein are provided to facilitate appreciation of example systems described herein. It is to be understood that the benefits and advantages are exemplary only, and not all examples described herein may have all, or even any, of the benefits and advantages described.

Example systems for separating liquid components (e.g., dewatering) of a solution or mixture herein may generally include a primary fluid input providing a feed stream containing a feed solution (e.g., an alcoholic beverage or solution); an FO membrane; and at least one fluid output including a concentrated feed stream containing the dewatered alcoholic solution (e.g., alcoholic solution concentrate). A diluted draw stream containing a diluted draw solution may be produced which can provide a second output, a permeate stream generally containing mostly water. Example systems herein may also include a draw stream input providing a draw stream containing the draw solution having a higher concentration of one or more components (e.g., permeable and/or impermeable solutes) than the feed stream and/or concentrated feed stream. While alcoholic solutions, including alcoholic beverages are used as examples of solutions having permeable solutes herein, it is understood that permeable solutes in addition to or in place of alcohol are also considered in each of the examples and can be used interchangeably or additionally with the example alcohols described.

FIG. 1 is a block diagram of a co-current FO system 100 for removing one or more components from a solution. The system 100 is configured as a co-current system. That is, the bulk flow of both the feed stream 112 and the draw stream 122 travels in the same direction through an FO element(s) 110 in the system 100. The system 100 includes a feed stream source 114 which provides at least some of the feed stream 112 to at least one FO element 110. The system 100 further includes at least one draw stream source 124 fluidly coupled to the at least one FO element 110 and configured to provide the draw stream 122 to the at least one FO element 110. The feed stream 112 may be present in, and travel through, the FO element 110 in a first side 115 thereof. The draw stream 122 may be present in, and travel through, the FO element 110 in a second side 125 thereof. The first side 115 and the second side 125 are separated by at least one FO membrane 130 disposed therebetween. The at least one FO element 110 can include an FO housing (e.g., a fluid tight container or assembly) at least partially defining an interior region in which the FO membrane 130 and first and second sides 115 and 125 are located. While the first side 115 is described as the feed side and the second side 125 is described as the draw side, the designations first and second are merely for differentiation between the elements and not meant to be limiting of the elements or configuration of the system 100. For example, the first and second sides 115 and 125 can include separate volumes, layers, serpentine paths, etc., so long as the first side 115 is at least partially chemically separated from the second side 125, such as via at least one FO membrane 130 therebetween.

As the feed stream 112 and draw stream 122 travel through the FO element 110, one or more permeable solutes of the feed stream 112 can permeate through the FO membrane 130 into the draw stream 122. The feed stream 112 can include a feed solution to be concentrated (e.g., dewatered), such as a solution containing any combination of permeable solutes (e.g., alcoholic solution) disclosed herein. The draw stream 122 can include a draw solution having of one or more common components (e.g., solvent(s), permeable and/or impermeable solute(s)) of the feed stream 112 therein. For example, the draw stream 122 can include one or more of alcohol, water, glucose, ethylene glycol, sucrose, fructose, glycerol, lactic acid, one or more dissolved salts, or any other component found in the feed stream 112. The presence or addition of one more permeable solutes (e.g., alcohol) and/or impermeable solutes (e.g., glycerol) to the draw stream 122 may be effective to selectively control the retention of one more permeable solutes in feed stream 112 as it is dewatered. Equal or higher amounts of the one or more common components (e.g., permeable and/or impermeable solutes in both the feed and draw streams) of the feed stream 112 present in the draw stream 122 can limit or prevent said one or more common components from crossing the FO membrane 130 from the feed stream 112 into the draw stream 122. For example, an equal or higher amount of alcohol and ethylene glycol present in the draw stream 122 than in the feed stream 112 can result in water being preferentially removed from the feed stream 112 via the FO membrane 130 while net alcohol and ethylene glycol amounts are retained. In the absence of alcohol in the draw stream 122, net transfer of alcohol may readily occur from the feed stream 112 to the draw stream 122 such that the final concentrated feed stream 116 would have a reduced alcohol concentration. In some embodiments, a combination of at least two permeable solutes and/or impermeable solutes in the draw stream can be used to provide a sufficient amount of osmotic pressure effective to limit migration of one or more permeable solutes (e.g., ethanol) from the feed stream to the draw stream. For example, a combination of one or more permeable solutes and impermeable solutes may induce a collectively higher osmotic pressure in the draw stream than the osmotic pressure present in the feed stream, thereby inducing selective permeation of the solvent (e.g., water) across the FO membrane while the permeable solute (e.g., ethanol) in the feed stream is substantially entirely retained. For example, an equal or higher amount of the combination of alcohol and glycerol present in the draw stream 122 over the amount of ethanol in the feed stream 112 can result in water being preferentially removed from the feed stream 112 via the FO membrane 130 while alcohol is retained. In some embodiments, at least one of the permeable or impermeable solutes may not be common to the feed stream and the draw stream.

As the feed stream 112 is concentrated in the FO element 110 by removal of at least one fluid component (e.g., solvent such as water) thereof through the FO membrane 130, a concentrated feed stream 116 (e.g., concentrated alcoholic solution) is produced. The concentrated feed stream 116 can be directed to one or more downstream product components 118 fluidly coupled to the first side 115 of the FO element 110. As the draw stream 122 (e.g., draw solution) is diluted by addition of one or more components from the feed stream 112 (e.g., water) via the FO membrane 130, the system 100 produces a diluted draw stream 126 (e.g., draw stream having a similar or higher concentration of one or more components thereof such as water, than were present when the draw stream entered the FO element 110). The diluted draw stream 126 can be directed to one or more downstream draw components 128 fluidly coupled to the second side 125 of the FO element 110.

The feed stream source 114 can include one or more of a tank, a pressurized pump, a valve, a pipe, a conduit, a hose, a temperature control element, etc. The feed stream source 114 is fluidly coupled (e.g., plumbed) to the first side 125 of the FO element 110. The feed stream source 114 can be configured to selectively provide a desired feed rate and/or pressure of the feed stream 112 to the FO element 110. The draw stream source 124 can include one or more of a tank, a pressurized pump, a valve, a pipe, a conduit, a hose, a temperature control element, etc. The draw stream source 124 is fluidly coupled to the second side 125 of the FO element 110. The draw stream source 124 can be configured to selectively provide a desired feed rate and/or pressure of the feed stream 112 to the FO element 110.

The FO element 110 may be any FO element or array of elements, including but not limited to, spiral wound FO element or standard (submersible) plate and frame FO element(s). The FO membrane(s) 130 of the FO element(s) 110 can include any permeable membrane such as a selectively permeably membrane configured to allow passage of one or more components of the feed stream therethrough, while rejecting one or more components of the feed stream. In some examples, the FO membrane 130 may be polymeric membrane including a polymeric material therein such as a polyamide, a cellulose acetate, aramid, poly(vinylidene fluoride), polyacrylonitrile, polysulphone, or any other polymer material suitable for use as a FO membrane. In some examples, the FO membrane may include thin film composite membrane including one or more of any of the polymer materials disclosed above. In some examples, the FO membrane 130 may include one or more support layers supporting one or more functional layers, such as one or more polyamide thin film layers. In some embodiments, the FO membrane 130 can include an array of FO membranes that may be in arranged parallel or in series, or in any combination of parallel and series. Examples of FO elements, FO membranes, and components thereof suitable for use in the FO systems described herein can include any of those described in U.S. Pat. No. 8,920,654, filed Sep. 30, 2011; U.S. patent application Ser. No. 14/137,903 filed Dec. 20, 2013; PCT Application PCT/US2014/029227 filed Mar. 14, 2014; and PCT Application PCT/US2014/029332 filed Mar. 14, 2014, each of which is incorporated by this reference in its entirety for any purpose.

The one or more downstream product components 118 fluidly coupled to the first side 115 can include one or more of a pipeline, a storage tank, a point of use device, a conduit, a pressure pump, a temperature control device (e.g., refrigerator or heater), a packaging apparatus, one or more FO elements, individual packages (e.g., kegs, bottles, etc.). The one or more downstream draw components 128 can include one or more of a pipeline, a conduit, a storage tank, a pump, a temperature control device (e.g., refrigerator), one or more draw solution recovery (e.g., regeneration) apparatuses, a waste storage, a permeate storage, etc. In some embodiments, the one or more draw solution recovery or regeneration apparatuses can include reverse osmosis (RO) elements (e.g., low rejection or standard reverse osmosis apparatuses) or one or more distillation apparatuses.

In use, a feed solution (e.g., 5% ABW alcohol) may be pressurized by a pump (e.g., feed stream source 114) forming low-pressure feed stream 112. The at least one FO element 110 may receive the feed stream 112 and dispense concentrated feed stream 116 (e.g., 30% ABW, at 2 gpm). The draw solution (e.g., 40% ABW at 30 gpm) may be pressurized by a pump (e.g., draw stream source 124) to form low-pressure draw stream 122. The draw stream 122 may include water, a permeable solute (e.g., ethanol), and at least one impermeable solute (e.g., sodium chloride, magnesium chloride, magnesium sulfate, glycerol, fructose, glucose, sucrose, polyethylene glycol). FO element 110 may receive low-pressure draw stream 122 and dispense a dilute draw stream 126 (e.g., 30% ABW at 40 gpm). The permeable solutes in the draw and/or feed stream(s) may include any of the permeable solutes disclosed herein. In the FO element 110, at least some water may permeate from the feed stream 112 to the draw stream 122 across at least one FO membrane 130 therebetween. At least some alcohol or other permeable solute(s) may be retained in the feed stream 112, such that the total amount of alcohol or other permeable solutes is maintained in the feed stream 112 while the feed stream 112 is dewatered, resulting in concentrated feed stream 116 (e.g., 30% ABW).

In some embodiments, the relative alcohol content in the concentrated feed stream 116 (as compared to the feed stream 112) can be increased by at least about 5% ABW, such as about 5% ABW to about 50% ABW, about 10% ABW to about 40% ABW, about 15% ABW to about 35% ABW, about 20% ABW to about 40% ABW, about 25% ABW to about 35% ABW, or less than about 60% ABW. In some embodiments, at least some alcohol can permeate from the draw stream 122 to the feed stream 112. Alternatively, at least some alcohol (and/or other permeable solute(s)) may permeate from the feed stream 112 to the draw stream 122 such that the alcohol (and/or other permeable solute(s)) concentration is decreased in the concentrated feed stream 116. For example, the relative alcohol content of the concentrated feed stream 116 can decrease by at least about 1% ABW as compared to the feed stream 112, such as about 1% ABW to about 40% ABW, about 5% ABW to about 20% ABW, or less than about 40% ABW. While alcohol is used as an example herein, similar or identical results to any of those disclosed herein can be obtained with other permeable solutes of the feed and draw streams, such as ethylene glycol, dissolved salts, etc. (e.g., wherein the concentration of the component is in weight % rather than % ABW).

In some examples (not shown) having an array of FO membranes 130 (e.g., in a baffled FO element) or an array of FO elements 110, the feed stream 112 and the draw stream 122 may be received by the same FO element 110 at the beginning of the array, and the concentrated feed stream 116 and the diluted draw stream 126 may be dispensed by the same FO element at the end of the array. Co-current operation may be used with spiral wound elements. Control of the trans-membrane pressure, operating with a positive and low (e.g., 1 to 5 psi) pressure from the feed stream to the draw stream may improve the permeable solute rejection and have significant impacts on the separation of draw components from the feed. Suitable pressures can include about 0.5 psi or more, such as about 0.5 psi to about 10 psi, about 1 psi to about 8 psi, about 2 psi to about 6 psi, about 3 psi to about 5 psi, about 0.5 psi to about 2 psi, about 2 psi to about 4 psi, about 1 psi to about 5 psi, less than about 5 psi, or less than about 3 psi.

In a co-current flow regime, the final concentration of alcohol (and/or other permeable or impermeable solute(s)) in the draw stream 122 and/or diluted draw stream 126 may be greater than or equal to the final alcohol (and/or other permeable solute(s)) concentration of the concentrated feed stream 116, for example 30% ABW. In some examples, an excess of alcohol may be used in the draw stream 122 and/or diluted draw stream 126 to maintain high retention of alcohol in feed streams 112 as they are dewatered. An excess of alcohol (or other permeable draw component) may be used to retain alcohol in the feed because the draw stream is diluted as water transfers from the feed stream to the draw stream, known as dilutive concentration polarization. Therefore, an excess of alcohol in the draw stream may be used to have an effective concentration difference. In addition, water permeating through the membrane may hydrogen bond with some permeable solutes (e.g., alcohol) and increase the permeation relative to permeable solutes that do not hydrogen bond with water. In some embodiments, the excess alcohol (and/or other permeable solute(s)) remains in excess even after dilution of the draw solution, the amount of which may be present in the draw stream 122 or the diluted draw stream 126. In some examples, an excess of greater than 0% ABW to about 60% ABW over the feed stream 112 alcohol content may be used. For example, the final concentration of alcohol in the diluted draw stream 126 can be at least about 1% ABW greater than the final alcohol concentration of the concentrated feed stream 116, such as about 1% ABW to about 60% ABW greater, about 5% ABW to about 50% ABW greater, about 10% ABW to about 40% ABW greater, about 15% ABW to about 35% ABW greater, about 20% ABW to about 40% ABW greater, about 25% ABW to about 35% ABW greater, about 1% ABW to about 20% ABW greater, about 20% ABW to about 40% ABW greater, about 40% ABW to about 60% ABW greater, about 1% ABW to about 5% ABW greater, about 1% ABW to about 10% ABW greater, about 5% ABW to about 15% ABW greater, about 10% ABW to about 20% ABW greater, or less than about 60% ABW greater than the final alcohol concentration of the concentrated feed stream 116. It has been discovered that a diluted draw stream 126 (and precursor draw stream 122) having a final alcohol concentration (or combined permeable solute and/or impermeable solute concentration) at least about 5% ABW greater (e.g., 10% ABW greater) than the final alcohol content of the associated concentrated feed stream 116 are particularly effective at producing a desired level of alcohol in the concentrated feed stream 116. For example, a final alcohol concentration of a concentrated feed solution may be about 30% ABW while the final alcohol concentration of the diluted draw stream can be at least about 40% ABW.

The species of the one or more components (e.g., solvent(s) such as water and/or permeable solute(s)) of the feed stream 112 that permeate the FO membrane 130 into the draw solution and extent (e.g., amount) of the permeation can be selectively adjusted by controlling one or more of the amount (e.g., concentration) and/or species of one or more permeable solutes (and/or impermeable solutes) of the draw solution of draw stream 122 (e.g., alcohol content), the surface area of the FO membrane 130 in contact with the feed and draw streams 112 and 122, the feed rate of one or both of the feed and draw streams 112 and 122 into the FO element 110, the pressure of one or both of the feed and draw streams 112 and 122 into the FO element 110 (and related hydrostatic pressure across the FO membrane 130), or the temperature of one or both of the feed and draw streams 112 and 122 into the FO element 110. Specifically, the amount of excess alcohol (e.g., ethanol) and/or other permeable or impermeable solutes used in the draw stream 122 may be dependent on one or more of flow rate(s), dewatering rates, recovery rate(s), temperature, feed stream composition, draw stream composition, membrane surface area in contact with the streams, type of membrane, pressure in the first and/or second side, etc.

Each of the different components of the systems disclosed herein can be operably (e.g., fluidly) coupled together via one or more conduits (e.g., pipes, tubes, hoses, etc.), valves, pumps, etc. For brevity, the components of the block diagrams are shown with arrows therebetween. It should be understood that each of the arrows may represent one or more conduits, valves, tanks, pumps, or other fluid connections between components of the systems.

Figure 2:
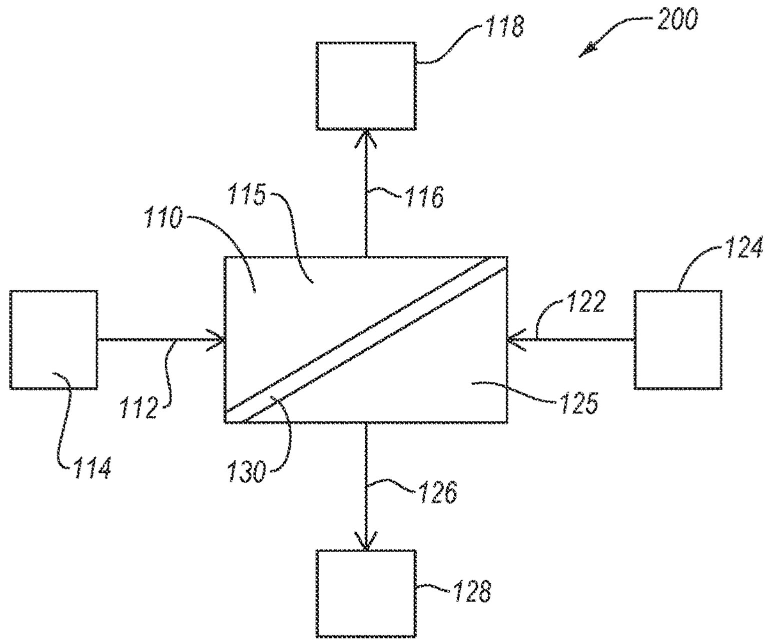
FIG. 2 is a block diagram of a countercurrent system for removing one or more components from solutions, according to examples described herein.

In some embodiments, the FO system or array of elements therein may be configured in a countercurrent configuration. FIG. 2 is a block diagram of a countercurrent system 200 for removing one or more components from solutions. In a countercurrent system, the feed stream and draw stream travel through the FO element in opposing directions. Countercurrent processing may allow the use of a reduced amount of permeable and impermeable solute(s) compared to co-current flows because the permeable and impermeable solute(s) concentration and osmotic differential between the feed stream and draw stream may be essentially constant. Countercurrent processing may allow the use of a reduced amount of permeable and impermeable solute compared to co-current processing because the concentration differential between the feed stream and draw stream may be essentially constant. The system 200 includes a feed stream source 114 which supplies a feed stream 112, at least one FO element 110 including at least one FO membrane 130, and one or more downstream product components 118 configured to receive the concentrated feed stream 116, as described above. The system 200 includes draw stream source 124 which supplies a draw stream 122, and one or more downstream draw components 128 which contain the diluted draw stream 126. As shown, the direction of travel of the draw stream 122 through the second side 125 of the FO element 110 is in the opposite direction of the flow of the feed stream 112 through the first side 115 of the FO element 110. In some examples, an advantage to the countercurrent configuration may be that the initial draw stream 122 alcohol and/or other permeable solute(s) concentration may be equal to or not necessarily significantly exceed (e.g., only about 1% ABW to about 5% ABW) the feed stream 112 concentrate alcohol concentration. In some examples, a small excess in draw stream 122 alcohol and/or other permeable solute(s) content (over the amount for effective dewatering of the alcohol solution) may be used to replace or offset alcohol and/or other permeable solute(s) lost in draw stream recovery (nanofiltration (NF)/RO permeate or distillation for example).

In some examples, a small loss of alcohol (e.g., greater than 0% ABW to about 3% ABW) in the feed stream 112 and/or concentrated feed stream 116 may be used (e.g., tolerated) to avoid adding excess alcohol to the draw stream 122. In such examples, the amount of alcohol in the draw stream 122 can be equal to or slightly less than (e.g., 0% ABW to 3% ABW less than) the alcohol content in the feed stream 112 and/or concentrated feed stream 116.

During use, the feed solution (e.g., 5% ABW at 12 gpm) may be pressurized by a pump (e.g., feed stream source 114) to form a low-pressure feed stream 112. FO element 110 may receive the feed stream 112 and dispense concentrated feed stream 116 (e.g., 30% ABW at 2 gpm). The draw solution (e.g., 30% ABW at 2 gpm) may be pressurized by a second pump (e.g., draw stream source 124) to form low-pressure draw stream 122. The FO element 110 may receive the low-pressure draw stream 122 and dispense diluted draw stream 126 (e.g., 5% ABW at 12 gpm). Water may permeate from the feed stream 112 to the draw stream 122 via the FO membrane 130 therebetween.

In some embodiments, the FO system can include more than one FO element. In some embodiments, the at least one FO element or array (e.g., parallel and/or series array) of FO elements may be plumbed in a countercurrent configuration with intermediate injection of high concentration draw solution or pure permeable and/or impermeable solutes (e.g., alcohol) at intermediate stages along the array. Such configurations can allow permeable and impermeable solute(s) to be added to a system, increasing the driving force (e.g., osmotic pressure induced by chemical potential) while balancing the permeable and impermeable solute (e.g., ethanol) concentration in the draw solution(s) along the FO membrane array.

Figure 3:
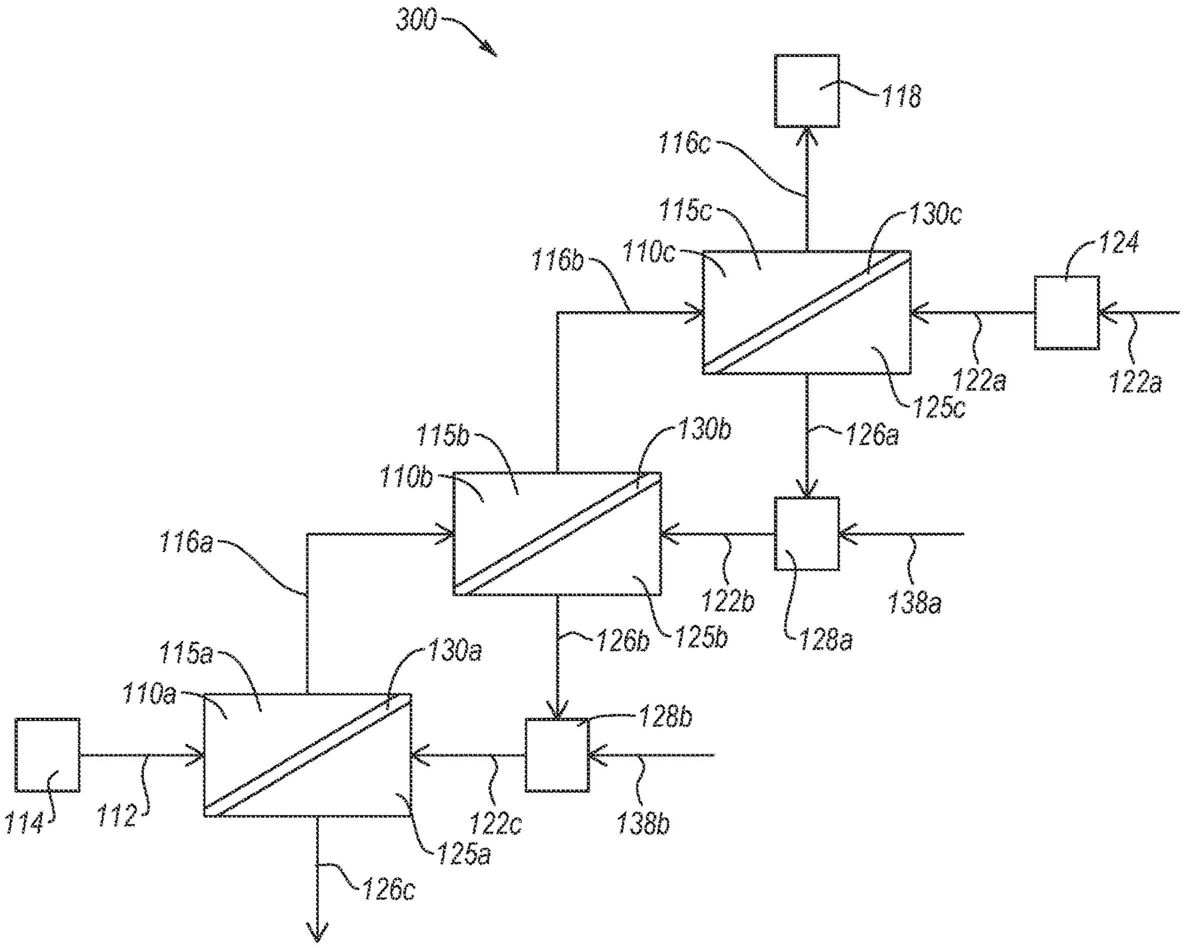
FIG. 3 is a block diagram of a countercurrent forward osmosis system for dewatering of alcoholic solutions, according to examples described herein.

FIG. 3 is a block diagram of a countercurrent FO system 300 for dewatering of alcoholic solutions. The countercurrent FO system 300 includes one or more (ports for) intermediate injections of alcohol (or high concentration alcohol solutions) into the diluted draw stream. The system 300 includes a plurality of FO elements 110*a*-110*c* fluidly coupled (e.g., plumbed) in series. The system 300 includes a feed stream source 114 operably coupled to a first FO element 110*a*. The first FO element 110*a* includes a first FO membrane 130*a* at least partially defining a first side 115*a* and a second side 125*a* therein. The first side 115*a* of the first FO element 110*a* is fluidly coupled to a second FO element 110*b*. The second FO element 110*b* includes a second FO membrane 130*b* at least partially defining a first side 115*b* and a second side 125*b* therein. The first side 115*b* of the second FO element 110*b* is fluidly coupled to a third FO element 110*c*. The third FO element 110*c* includes a second FO membrane 130*c* at least partially defining a first side 115*c* and a second side 125*c* therein. The first sides 115*a*-115*c* of the FO elements 110*a*-110*c* are coupled together to form a collective first side of the system 300. The first side of the system 300 can include one or more components in fluid communication with the first sides 115*a*-115*c* of the FO elements 110*a*-110*c*, such as the feed stream source 114.

As the feed stream 112 passes through the series of FO elements 110*a*-110*c*, the feed stream 112 becomes more and more concentrated. For example, as the feed stream 112 passes through the first side 115*a* of the first FO element 110*a*, the feed stream 112 is dewatered (e.g., concentrated) to form concentrated feed stream 116*a* having a higher concentration of alcohol than the feed stream 112. As the concentrated feed stream 116*a* is passed through the first side 115*b* of the second FO element 110*b*, the concentrated feed stream 116*a* is further concentrated (e.g., dewatered) to form second concentrated feed stream 116*b* having a higher concentration of alcohol than one or both of feed stream 112 and concentrated feed stream 116*a*. As the second concentrated feed stream 116*b* is passed through the first side 115*c* of the third FO element 110*c*, the second concentrated feed stream 116*b* is further concentrated to form third concentrated feed stream 116*c* having a higher concentration of alcohol than one or all of feed stream 112 and concentrated feed stream(s) 116*a* and/or 116*b*. The third concentrated feed stream 116*c* can be directed to one or more downstream product components 118, such as any of those disclosed herein.

On the second side of the system 300, a draw stream source 124 configured to provide a draw stream 122 to the system 300. The draw stream source 124 is operably coupled to the second side 125*c* of the third FO element 110*c*. As the draw solution is passed through the second side 125*c*, the draw stream 122*a* is diluted to form diluted draw stream 126*a*. Diluted draw stream 126*a* is directed to downstream draw components 128*a*. Downstream draw components 128*a* can include one or more of at least one conduit (e.g., pipe), a pump, a valve, a tank, an injection port, a mixing apparatus, etc. For example, the downstream draw components 128*a* can include a conduit having an injection port wherein an injection of one or more components (e.g., alcohol and/or glycerol) of the draw stream 122*a* may be added to the diluted draw stream 126*a* to form a first reconstituted draw stream 122*b*. The alcohol injection port can be configured to provide an injection, titer, or stream of alcohol (or other draw stream component(s)) sufficient to selectively control (e.g., raise) the concentration of alcohol (or other draw stream component(s)) in the diluted draw stream 126*a*. For example, the alcohol injection port can be used to provide an injection 138*a* configured to raise the concentration of alcohol at least about 5% ABW over the diluted draw stream 126*a*, such as raise the concentration to at least about 10% ABW more than the alcohol content of the diluted draw stream 126*a*, at least about 5% ABW over the concentrated feed stream 116*a* or 116*b*, at least about 10% ABW more than the alcohol content of the second concentrated feed stream 116*a* or 116*b*, or at least as high as the draw stream 122*a*. The downstream draw components 128*a* are operably coupled to the second side 125*b* of the second FO element 110*b*.

The first reconstituted draw stream 122*b* can be directed through the second side 125*b* of the second FO element 110*b* to draw one or more components out of the feed stream present in the first side 115*b* thereof. As the first reconstituted draw stream 122*b* absorbs components (e.g., water) from the feed solution in the second FO element 110*b*, the reconstituted draw stream 122*b* is diluted to form a second diluted draw stream 126*b*. The second side 125*b* of the second FO element 110*b* can be fluidly coupled to one or more downstream draw components 128*b*. The one or more downstream draw components 128*b* can be similar or identical to one or more downstream draw components 128*a* disclosed above. For example, the second diluted draw stream **126*b* can be directed from the second side 125*b* through one or more of a conduit, a pump, or mixing tank. The one or more downstream draw components 128*b* can include a second alcohol injection port wherein alcohol (or any other draw stream component) can be added to the second diluted draw stream 126*b* to control the concentration of the alcohol therein. The second alcohol injection port can be configured to provide an injection, titer, or stream of alcohol (or other draw solution components) to the second diluted draw stream 126*b* sufficient to selectively control the concentration of alcohol in the second diluted draw stream 126*b*. For example, the alcohol injection port can be used to provide a second injection 138*b* configured to raise the concentration of alcohol (or other component(s) of the draw solution) by at least about 5% ABW over the second diluted draw stream 126*b*, such as at least about 10% ABW more than the alcohol content of the second diluted draw stream 126*b*, at least about 5% ABW over the concentrated feed stream 116*a*, at least about 10% ABW more than the alcohol content of the second concentrated feed stream 116*b*, at least about 5% ABW over the feed stream 112, at least about 10% ABW more than the alcohol content of the feed stream 112, at least as high as the feed stream 112, or at least as high as the draw stream 122*a*. The downstream draw components 128*b* are operably coupled to the second side 125*a* of the firsts FO element 110*a***.

The second reconstituted draw stream **122*c* can be directed through the second side 125*a* of the first FO element 110*a* to draw one or more components out of the feed stream 112 present in the first side 115*a* thereof. As the second reconstituted draw stream 122*c* absorbs components (e.g., water) from the feed solution in the first FO element 110*a*, the second reconstituted draw stream 122*c* is diluted to form a third diluted draw stream 126*c*. The second side 125*a* of the first FO element 110*a* can be fluidly coupled to one or more downstream draw components 128*c*, such as any downstream draw components disclosed herein. For example, the third diluted draw stream 126*c* can be directed from the second side 125*a*** through one or more of a conduit, a pump, or a storage tank.

The second sides **125*a*-125*c* (and portions of the system 300 in fluid communication therewith) can collectively form a second side of the system 300**. The second side of the system is separated from the first side of the system by the FO membrane(s) and only has contact therewith via the FO membrane(s). As used in some examples herein, the first side can be a feed side and the second side can be a draw side.

As shown in FIG. 3, in some examples there may be multiple intermediate injection stages, while in other examples there may only be one intermediate injection stage (e.g., port). In some embodiments, the system 300 can include one or more outputs between any of the FO elements on one or both of the first (feed) side or second (draw) side. For example, an output such as a valve and drain line can be disposed between the first FO element **110*a* and the second FO element 110*b*, and second FO element 110*b* and the third FO element 110*c*. The output(s) can allow selective capture of the concentrated feed streams 116*a* and 116*b* prior to the end of the system 300 (e.g., the one or more downstream product components 118). In some embodiments, the system 300 can include one or more pumps between any of the FO elements on one or both of the first (feed) side or second (draw) side such as to control pressure or flow rates at any of the components of the system 300**. In some embodiments, rather than reconstituting the draw solution(s), the diluted draw solutions can be removed from the system at each FO element and a new draw solution can be introduced to the second side of each respective FO element via a new, distinct draw stream source.

In some examples, feed solution may be pressurized by a pump (e.g., feed stream source 114) to form low-pressure feed stream 112 (e.g., 5% ABW at 12 gpm). The first FO element **110*a* may receive low-pressure feed stream 112 and dispense concentrated feed stream 116*a* (e.g., 6.7% ABW at 8.7 gpm). The second FO element 110*b* or may receive the concentrated feed stream 116*a* and dispense the second further concentrated feed stream 116*b* (e.g., 11.3% ABW at 5.3 gpm). The third FO element 110*c* may receive the second concentrated feed stream 116*b* and dispense the third, further concentrated feed stream 116*c* (e.g., 30% ABW at 2 gpm). Draw solution may be pressured by pump (e.g., draw stream source 124) to form low pressure draw stream 122*a* (e.g., greater than 30% ABW, 15% glycerol by weight (GBW), at 12 gpm). The third FO element 110*c* may receive low-pressure draw stream 122*a* and dispense diluted draw stream 126*a* (e.g., 23.5% ABW, 11.7% GBW, 15.3 gpm). An injection 138*a* of concentrated glycerol and water (e.g., 30% GBW at 16.7 gpm) may be combined with diluted draw stream 126*a* via an injection port, valve, and/or pump (e.g., downstream draw component 128*a*) to form a first reconstituted draw stream 122*b* (e.g., 11.25% ABW, 21.2% GBW, at 32 gpm). The second FO element 110*b* may receive the first reconstituted draw stream 122*b* and dispense diluted draw stream 126*b* (e.g., 10.2% ABW, 19.2% GBW, at 35.3 gpm). A second injection 138*b* of concentrated glycerol and water (e.g., 30% GBW at 17 gpm) may be combined with the second diluted draw stream 126*b*, such as by an injection port, valve, or a pump (e.g., downstream draw component 128*b*) to form second reconstituted draw stream 122*c* (e.g., 6.9% ABW, 22.7% GBW, at 52.3 gpm). The first FO element 110*a* may receive the second reconstituted draw stream 122*c* and dispense the third diluted draw stream 126*c* (e.g., 6.5% ABW, 21.4% GBW, at 55.7 gpm). The third diluted draw stream 126*c* may can be directed to one or more downstream draw components 128*c*. The third diluted draw stream 126*c*** may be processed by any one of several draw solution recovery/regeneration techniques described herein.

Figure 4:
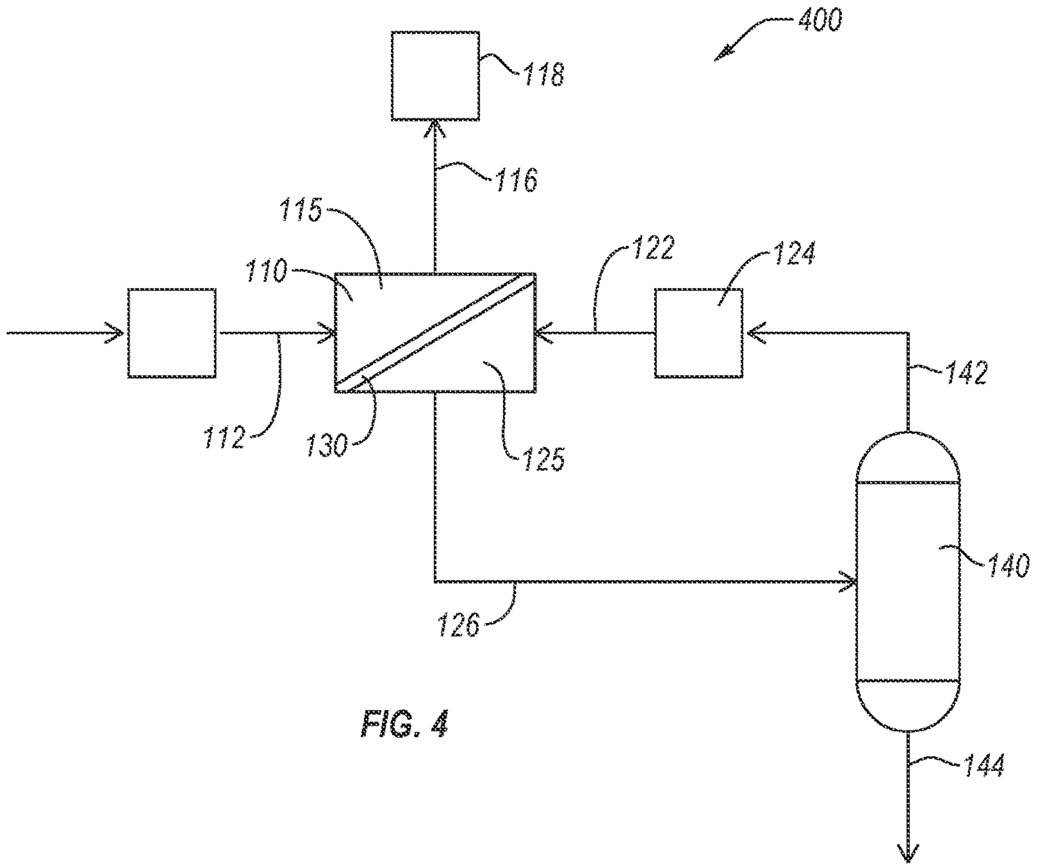
FIG. 4 is a block diagram of forward osmosis system for dewatering alcoholic solutions including a distillation apparatus for recovery of the draw solution by distillation, according to examples described herein.

In some examples, the draw solution may be recovered (e.g., regenerated or reconstituted) by distillation. FIG. 4 is a block diagram of FO system 400 for dewatering alcoholic solutions, the system 400 including a distillation apparatus 140 for recovery (e.g., regeneration) of the draw solution by distillation. The system 400 includes a feed stream source 114 configured to supply the feed stream 112 to the first side 115 of at least one FO element 110 having at least one FO membrane 130 therein. The system 400 includes a draw stream source 124 configured to supply the draw stream 122 to the second side 125 of the FO element 110. The system includes at least one downstream product component 118 fluidly coupled to the first side 115 of the FO element 110. The system 400 further includes at least one regeneration apparatus fluidly coupled to the output orifice of the second side 125 of the FO element 110.

The at least one regeneration apparatus may be provided to at least partially restore the diluted draw stream 126 to the same composition (e.g., relative amounts) as the draw solution of draw stream 122. As shown, the at least one regeneration apparatus can include distillation apparatus 140. The distillation apparatus 140 can be fluidly coupled to and configured to receive the diluted draw stream 126 from the second side 125 of the FO element 110 and concentrate at least one solute (e.g., permeable and/or impermeable solute) in the same via distillation. For example, the distillation apparatus 140 can be configured to produce a distillate stream 142 which may be used as or to augment the draw solution of draw stream 122. The distillation apparatus 140 can include a distillation column or array (e.g., in series, in parallel, or both) of distillation columns. The distillation apparatus 140 may include one or more membrane distillation or pervaporation apparatuses, and distillation may include membrane distillation or pervaporation. The distillation apparatus 140 may receive the diluted draw stream 126 and produce distillate stream 142 (e.g., ethanol distillate) and draw permeate 144 (e.g., 10 gpm). The distillate stream 142 can be directed (e.g., recirculated via one or more conduits and/or pumps) to the draw stream source 124. The draw permeate 144 (e.g., still bottoms, such as water) can be removed from the system 400 via one or more conduits, valves, and/or pumps operably coupled to the distillation apparatus.

In some examples, feed solution may be pressurized by a pump (e.g., feed stream source 114) to form low-pressure feed stream 112 (e.g., 5% ABW, 12 gpm). The FO element 110 may receive low-pressure feed stream 112 and output concentrated feed stream 116 (e.g., 30 ABW at 2 gpm). Draw solution (e.g. at least about 30% ABW at 2 gpm) may be pressurized by a pump (e.g., draw stream source 124) forming low-pressure draw stream 122. The draw solution may include water and alcohol (e.g., ethanol). FO element 110 may receive low-pressure draw stream 122 and dispense diluted draw stream 126 (e.g., 5% ABW at 12 gpm). The distillation apparatus 140 (e.g., column or array of distillation columns) may receive diluted draw stream 126 and produce distillate stream 142 (e.g., ethanol distillate) and draw permeate 144 (e.g., reduced-ethanol permeate at 10 gpm). In some examples, portions of diluted draw stream 126 are received by the draw stream source 124 (e.g., a pump) in combination with distillate stream 142 (e.g., ethanol) to produce a draw solution of desired water and solute(s) (e.g., alcohol and dissolved sugar(s)) composition. In some embodiments, the output of the second side 125 is operably coupled to the downstream draw components 128. The draw permeate 144 may be directed out of the system via the one or more downstream draw components 128.

Figure 5:
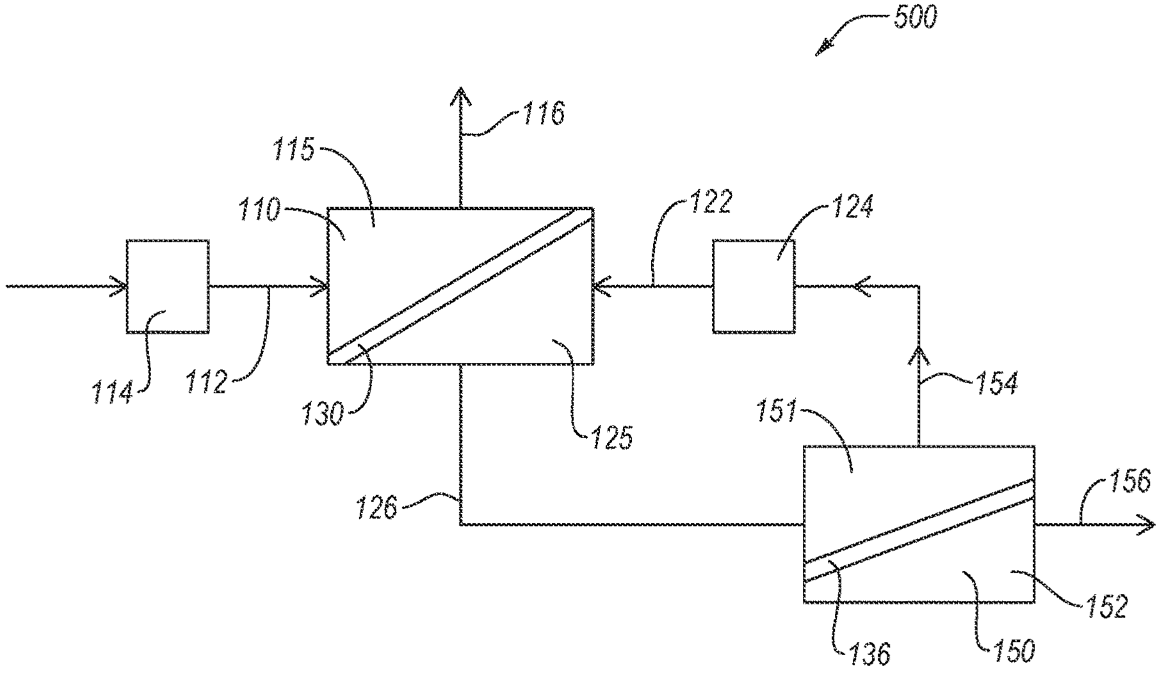
FIG. 5 is a block diagram of a countercurrent forward osmosis system for dewatering alcoholic solutions with a reverse osmosis element for recovery of the draw solution via reverse osmosis, according to examples described herein.

In some embodiments, a regeneration apparatus can include at least one reverse osmosis (RO) element having at least one RO membrane therein. In some embodiments, the draw solution may be at least partially recovered (e.g., regenerated) by RO. FIG. 5 is a block diagram of a countercurrent FO system 500 for dewatering an alcohol solution, the system 500 including an RO element 150 for recovery of the draw solution via RO. The system 500 includes a feed stream source 114 configured to provide a feed stream 112 to an FO element 110. The FO element 110 includes FO membrane 130 dividing a first side 115 from a second side 125 of the FO element 110. The first side 115 can be operably coupled to one or more downstream product components as described herein. The second side 125 can be operably coupled to a draw stream source 124 configured to supply a draw stream 122 into the second side 125 of the FO element 110. As the draw stream 122 is diluted in the FO element 110, a diluted draw stream 126 is produced therefrom. The diluted draw stream 126 can be directed (e.g., via one or more conduits, pumps, valves, etc.) to the RO element 150. The RO element 150 can include a housing containing an RO membrane 136 disposed therein. The housing (e.g., vessel or assembly) can be fluid tight and configured to hold the RO membrane 136 effective to at least partially define a first side 151 and second side 152 therein. The first side 151 and the second side 152 of the RO membrane can be at least partially chemically separated by the RO membrane 136, thereby defining two distinct volumes within the housing. The first side 151 and the second side 152 of the RO element 150 can be similar or analogous to the first side 115 and second side 125 of the FO element 110 described herein. The RO membrane 136 can include any membrane suitable for RO (e.g., a standard RO membrane or a low rejection RO membrane). For example, the RO membrane 136 may separate at least some water, alcohol or other permeable solutes, and impermeable solutes, from a solution having water, alcohol, and permeable and impermeable solutes therein. A single stage of RO may increase the ABW (or other permeable or impermeable solutes content) by as much as 5 wt %, such as about 1 wt % to about 3 wt %, or less than 3 wt %.

The diluted draw stream 126 can be directed to the first side 151 of the RO element 150 where the RO membrane 136 separates at least some of the permeable solutes such as alcohol from the other solutes (e.g., (permeable and/or impermeable solutes such as glucose, fructose, glycerol, dissolved salts, etc.) and at least some of the water to form an RO concentrate in RO concentrate 154. Such separation can be carried out in a stream or batch. The RO concentrate 154 may contain mostly water and permeable and impermeable solutes. For example, the RO concentrate 154 may contain at least some alcohol therein. At least some of the RO concentrate 154 can be directed back to the draw stream source 124. In some embodiments, the RO concentrate 154 can be combined with one or more components of the draw solution to form (e.g., reform) the draw stream 122. For example, the RO concentrate 154 can be combined with at least alcohol to regenerate draw stream 122. The RO element 150 can also produce an RO permeate 156 from the second side 152 thereof. The RO permeate 156 can include water, alcohol, and one or more other permeable solutes therein. The RO permeate 156 can be further processed to regenerate (e.g., concentrate or more fully recover) at least some of the components thereof (e.g., one or both of permeable solutes or impermeable solutes) such as alcohol or glycerol, via distillation or further RO operations. In some embodiments, the RO permeate 156 can include or can be further processed to be substantially pure water. In some embodiments, one or more pumps (not shown) can be used to control pressure of the diluted draw stream 126 prior to entry into the RO element 150.

In some embodiments, the RO element(s) 150 can be configured as low rejection RO element(s) and/or spiral wound reverse osmosis element(s). In some examples, such as in low rejection RO elements, an element with reduced solute rejection may be used. Low rejection RO elements (e.g., RO elements having low rejection RO membranes) may be used to concentrate solutions with higher osmotic pressures than standard RO elements. In some embodiments, low rejection RO elements can be used to concentrate one or more impermeable solutes, such as sodium chloride, magnesium chloride, glycerol, sucrose, fructose, glucose, one or more dissolved salts, etc. The RO element(s) 150 may be configured as arrays of elements in parallel or in series. The elements or arrays of elements may be operated in a continuous system or in a batch system with buffer tanks.

Figure 6:
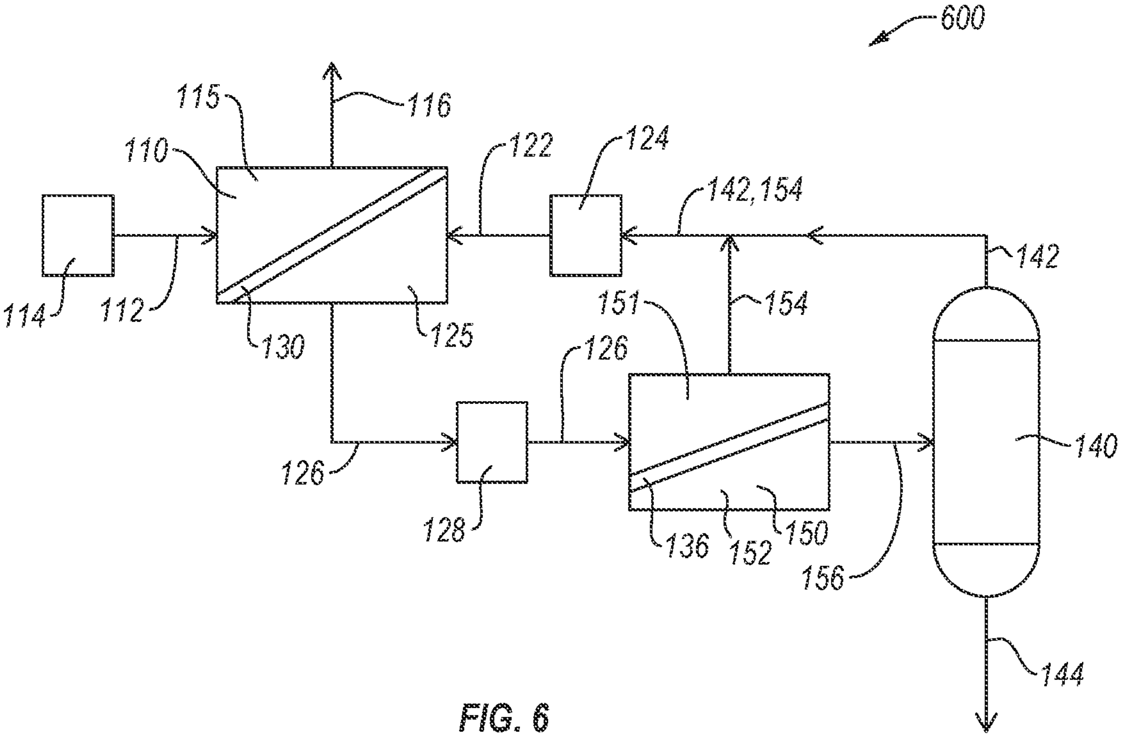
FIG. 6 is a block diagram of a forward osmosis system for dewatering alcoholic solutions configured for recovery of the draw solution by reverse osmosis and distillation, according to examples described herein.

In some embodiments, an FO system for removing one or more components of a fluid mixture can include more than one draw stream regeneration apparatus. FIG. 6 is a block diagram of an FO system 600 configured for recovery of the draw solution by reverse osmosis and distillation. The system 600 can be configured as a countercurrent system as shown. The system 600 includes a feed stream source 114 configured to deliver a feed stream 112 to an FO element 110. The FO element 110 includes an FO membrane 130 separating the first side 115 of the FO element 110 from the second side 125 of the FO element and is configured to selectively allow transport of one or more components from the feed stream 112 in first side 115 into the draw stream 122 in the second side 125. The system 600 can include a draw stream source 124 operably coupled to and configured to provide the draw stream 122 to the second side 125. The feed stream 112 is concentrated via FO as the draw stream 122 draws some of the components therefrom forming concentrated feed stream 116 (e.g., dewatered alcoholic solution). The concentrated feed stream 116 exits the first side 115 and is directed to downstream product components (not shown).

The draw stream 122 is diluted as one or more components of the feed stream 112 migrate across the FO membrane 130 to form diluted draw stream 126. The diluted draw stream 126 can include one or more components (e.g., water) of the feed stream 112 as at least one diluent therein. The diluted draw stream 126 exits the second side 125 and is directed to one or more downstream draw components 128. The one or more downstream draw components can include a pump configured to control pressure of the diluted draw stream 126. The one or more downstream draw components 128 can be operably coupled to one or more regeneration apparatuses, such as at least one RO element 150.

The at least one RO element 150 can include an RO membrane 136 configured to separate one or more components of the diluted draw stream 126. The first side 151 of the RO element 150 can include the diluted draw stream 126 which is converted to RO concentrate 154 therein via RO. The RO concentrate 154 can primarily include a mixture of water and impermeable solute(s). In some embodiments, the RO concentrate 154 can include at least some permeable solutes therein. At least a portion of the RO concentrate 154 can be directed to (e.g., recycled back to) the draw stream source 124. The second side 152 includes an RO permeate 156 therein. The RO permeate 156 may primarily include a mixture of water and permeable solute(s) (e.g., ethanol). In some embodiments, the RO permeate 156 can include at least some impermeable solutes therein. The RO permeate 156 is directed to a distillation apparatus 140.

The distillation apparatus 140 can include one or more distillation columns. The RO permeate 156 is distilled in the distillation apparatus 140 effective to produce a distillate stream 142 which can be directed back to the draw stream source 124. The distillate stream 142 can include predominantly one or more permeable concentrates (e.g., entirely alcohol) therein. The distillation apparatus 140 also produces a draw permeate 144 (e.g., still bottoms containing one or more permeable and/or impermeable solutes) which can be directed to one or more downstream components (not shown), such as waste storage or treatment, delivery apparatuses, or for further treatment. In some embodiments, the draw permeate 144 can include a permeate having a lower amount of alcohol than the distillate stream 142, such as a reduced ethanol distillate or even substantially pure water.

The distillate stream 142 (e.g., high alcohol content fluid) can be directed back to the draw stream source 124. At least a portion of the distillate stream 142 can be combined with at least a portion of the RO concentrate 154 to form the draw stream 122. One or more pumps can be disposed between any of the components of the system 600 to regulate pressure or speed of the fluids therein.

In some examples, an alcoholic solution may be pressurized by a pump (e.g., feed stream source 114) to form low-pressure feed stream 112 (e.g., about 5% ABW at 12 gpm). FO element 110 receives the low-pressure feed stream 112 and dispenses concentrated feed stream 116 (e.g., 30% ABW at 2 gpm). Draw solution (e.g. 30% ABW at 2 gpm) may be pressurized by a pump (e.g., draw stream source 124) forming low-pressure draw stream 122. The draw solution includes a mixture of water, permeable solute(s) (e.g., ethanol), and impermeable solute(s) (e.g., glucose, fructose, glycerol, sodium chloride, magnesium chloride, other dissolved salts, etc.). The FO element 110 receives low-pressure draw stream 122 and dispenses diluted draw stream 126 (e.g., 5% ABW at 12 gpm). A downstream draw component 128, such as a pump receives diluted draw stream 126 and produces high-pressure diluted draw stream 126 (e.g., 500-800 psi). At least one RO element 150 receives high-pressure draw stream 126 and dispenses RO concentrate 154 (e.g., an RO reject stream) and RO permeate 156. RO concentrate 154 may be a mixture of water and impermeable solute(s) such as glycerol. At least some permeable solute(s) such as ethanol may be present in the RO concentrate 154. RO permeate 156 may be a mixture of water and permeable solute (e.g., ethanol). Distillation apparatus 140 receives RO permeate 156 and produces ethanol distillate in the distillate stream 142, and also produces reduced-ethanol permeate in the draw permeate 144. The ethanol distillate stream 142 may be plumbed to the RO concentrate 154 to reform draw stream 122. In some examples, distillation of the RO permeate 156 may be used. In other examples, distillation of the diluted draw stream 126 to produce a diluted draw solution with reduced alcohol, followed by RO to concentrate additional permeable and impermeable solute(s) may be used. Accordingly, in some embodiments, the distillation apparatus 140 can be disposed "upstream" from the RO element 150.

Figure 7:
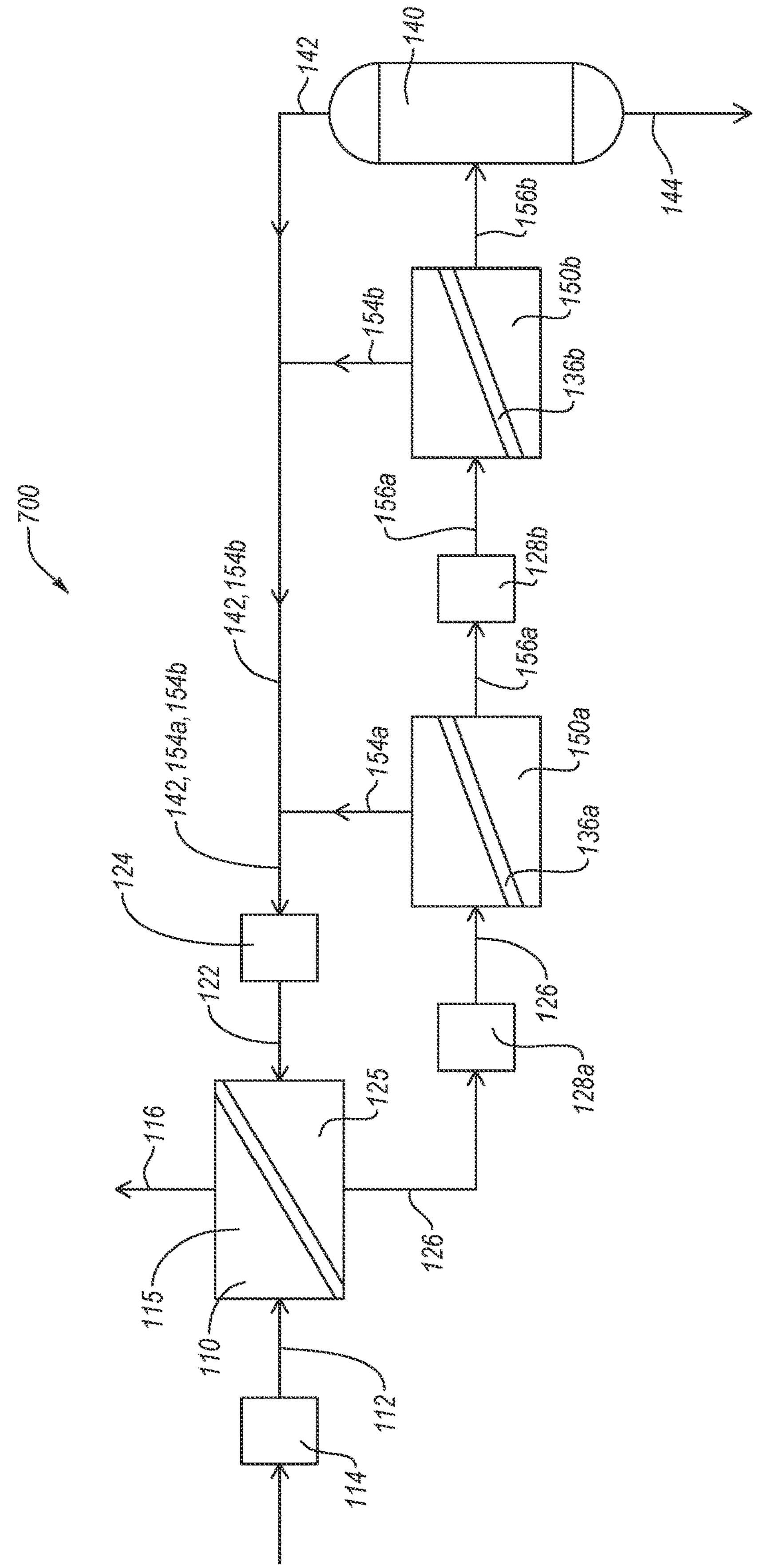
FIG. 7 is a block diagram of a forward osmosis system for dewatering an alcoholic solution, according to examples described herein.

In some embodiments, multiple RO elements can be used to provide step wise regeneration of a draw solution. FIG. 7 is a block diagram of an FO system 700 for dewatering an alcoholic solution. The system 700 includes one or more components configured for recovery of the draw solution by low rejection RO, reverse osmosis, and distillation. The system includes a feed stream source 114 configured to deliver a feed stream 112 to the FO element 110. The FO element includes a first side 115, second side 125, and FO membrane 130 therein. The feed stream 112 is concentrated in the FO element to produce concentrated feed stream 116 as disclosed herein. The system 700 includes a draw stream source 124 configured to provide draw stream 122 into the FO element 110. As the draw stream 122 travels through the FO element 110, the draw stream 122 is diluted to form diluted draw stream 126. Diluted draw stream 126 is directed through a plurality of draw stream regeneration apparatuses via one or more downstream draw components 128.

The diluted draw stream 126 is initially directed to a first RO element **150*a* where a first RO concentrate 154*a* is formed. The first RO element 150*a* can be configured as a low rejection RO element, that is, an RO element that having a low rejection RO membrane which has a relatively high flux and low rejection rate (e.g., relative to a standard RO element with greater than 99% impermeable solute rejection). For example, a low rejection RO membrane 136*a* may have a rejection rate of 50% of impermeable solutes and can promote a flux therethrough at least 50% higher than a standard RO membrane 136*b* at a given hydrostatic pressure. The low rejection rate of the low rejection RO element may allow the concentration of solutions with impermeable solute species concentrations at osmotic pressures exceeding the hydrostatic limit (e.g., 1000 psi) by allowing impermeable solute species through the membrane, thereby reducing the concentration difference across the membrane. In some embodiments, low rejection RO membranes 136***a* and elements having the same may have a solute rejection rate between about 20 to about 80 percent, such as about 30 to about 70 percent, or about 40 to about 60 percent. The first RO concentrate 154*a* can have a higher concentration of one or more components of the draw stream 122 than the diluted draw stream 126. For example, the first RO concentrate 154*a* can include a mixture of alcohol and water having a higher concentration of alcohol and/or other solutes than the diluted draw stream 126. The RO concentrate 154*a* is directed back (e.g., recycled) to the draw stream source 124, such as via one or more conduits, valves, or pumps. The first RO element 150*a* produces a first RO permeate 156*a* which is primarily a mixture of water, impermeable solute, and alcohol. The concentration of impermeable solute(s) in the first RO permeate 156*a* is lower than in the diluted draw stream 126. The first RO permeate 156*a* can be directed to a second RO element 150*b* via one or more downstream draw components 128*b* (e.g., a pressurized pump).

The second RO element 150*b* can be configured as a standard RO element, that is, an RO element including an RO membrane 136*b* having a lower flux and higher rejection rate than the low rejection RO membrane 136*a*. As the first RO permeate 156*a* travels through the second RO element 150*b*, a second RO concentrate 154*b* and second RO permeate 156*b* are produced. The second RO concentrate 154*b* can primarily include one or more concentrated impermeable solutes (e.g., dissolved salts, glucose, fructose, at least some alcohol, etc.) and water, while the second RO permeate 156*b* can include primarily a mixture of alcohol and water. The second RO concentrate 154*b* is directed back to the draw stream source 124 via one or more conduits, pumps, valves, etc. The second RO permeate 156*b* is directed to distillation apparatus 140. Distillation apparatus 140 can receive the second RO permeate 156*b* and distill the same to produce distillate stream 142 and draw permeate 144 (e.g., RO permeate still bottoms). The distillate stream 142 can include primarily alcohol (e.g., concentrated alcohol) and the draw permeate 144 can include water and alcohol, such as in a highly diluted ethanol solution. The distillate stream 142 can be directed to the draw stream source 124. The distillation apparatus 140 can be plumbed to the draw stream source 124 via one or more conduits. At least some of the distillate stream 142 can be combined with one or more of at least some of the first RO concentrate 154*a* or at least some of the second RO concentrate 154*b* to reconstitute (e.g., regenerate) the draw solution or draw stream 122.

In some examples, an alcoholic beverage feed solution may be pressurized by a pump to form low-pressure feed stream 112 (e.g., 5 ABW at 12 gpm). The FO element 110 (or array of elements) may receive low-pressure feed stream 112 and dispense concentrated feed stream 116 (e.g., 30% ABW at 2 gpm). Draw solution (e.g., 30% ABW at 2 gpm) may be pressurized by a pump (e.g., draw stream source 124) to form low-pressure draw stream 122. The draw solution may be a mixture of water, permeable solutes such as ethanol, and impermeable solute(s) such as glycerol. The draw solution can be composed to have a higher concentration of one or more components of the alcoholic beverage feed solution to cause the feed solution to at least partially retain the one or more components therein. FO element 110 may receive low-pressure draw stream 122 and dispense diluted draw stream 126 (e.g., 5% ABW at 12 gpm). The diluted draw stream 126 can be routed through a pump (e.g., downstream draw component 128*a*) to produce high-pressure diluted draw stream 126 (e.g., about 800 psi). The (low rejection) first RO element 150*a* receives the high-pressure diluted draw stream 126 and dispenses a mixture of water and impermeable solute(s) (the first RO concentrate 154*a*) at a higher concentration than in the diluted draw stream 126 and may include an alcohol (e.g., ethanol) at a similar concentration (e.g., within about 5% ABW) to the diluted draw stream 126. The (low rejection) first RO element 150*a* may also dispense a mixture of water, impermeable solute(s), and ethanol (e.g., first RO permeate 156*a*); the impermeable solute(s) being present at a lower concentration than in the diluted draw stream 126. The (low rejection) first RO element 150*a* may produce ethanol at a similar concentration to the diluted draw stream 126 in the first RO permeate. In some examples, the ethanol concentration may be similar (e.g., less than about 5% ABW, such as about 1% ABW) in the feed stream, RO concentrate stream, and RO permeate stream of the (low rejection) first RO element. In some examples, negative rejection (e.g., increased permeation of ethanol) may change the concentration in the RO concentrate stream and RO permeate stream by as much as 5% ABW each.

The first RO permeate 156*a* is directed through a pump (e.g., downstream draw component 128*b*) to produce high pressure RO permeate 156*a*. The second RO element 150*b* receives the high pressure RO permeate 156*a* and produces a second RO concentrate 154*b* and a second RO permeate 156*b*. The second RO concentrate 154*b* is primarily concentrated impermeable solute(s), permeable solute(s) (e.g., ethanol) and water. The second RO permeate 156*b* is primarily a mixture of permeable solute(s) in solvent (e.g., ethanol in water). The second RO permeate stream is directed to a distillation column (e.g., distillation apparatus 140. The distillation column produces concentrated ethanol (e.g., distillate 142) and a very diluted ethanol stream (e.g., draw permeate 144). The distillate 142 may be plumbed to combine with the second RO concentrate 154*b* to form a pre-draw stream comprising both the distillate 142 and RO concentrate 154*b*. Pre-draw stream may be plumbed to combine with and the first RO concentrate 154*a* to form draw stream 122.

In some embodiments, the draw solution can be recovered using a plurality of RO elements. For example, the draw solution or draw stream 122 may be recovered by a first RO stage and a second RO stage. The RO elements in the first and second (recovery) stages may be the same, or may be different, providing different levels of rejection of solutes. In an example, an FO system can include a brackish water RO element in the first stage and a seawater RO element in the second stage. In some embodiments, an FO system can include a low rejection RO element in conjunction with (e.g., prior to) the first and second RO elements.

Figure 8:
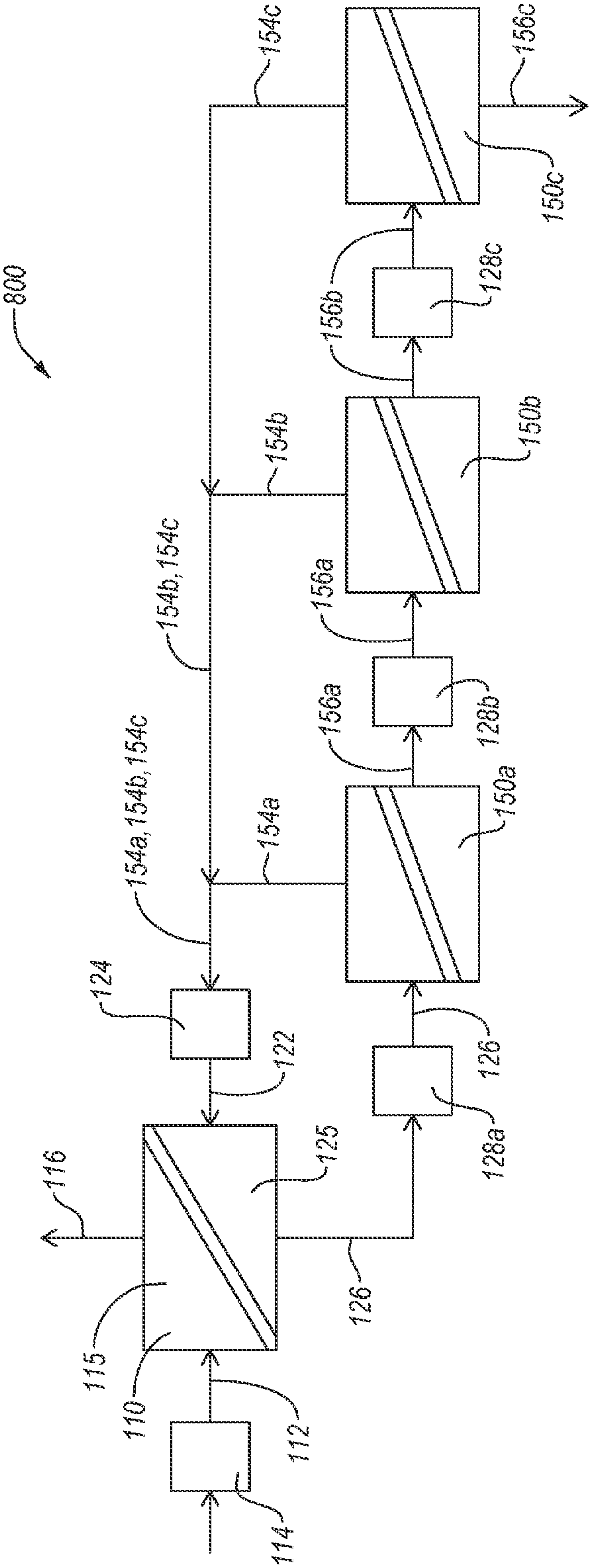
FIG. 8 is a block diagram of a forward osmosis system for dewatering an alcoholic solution and configured for recovery of a draw solution via multiple reverse osmosis operations, according to examples described herein.

FIG. 8 is a block diagram of an FO system 800 for dewatering an alcoholic solution and configured for recovery of a draw solution via multiple reverse osmosis operations. The FO system 800 for dewatering an alcoholic solution is configured for recovery of a draw solution via low rejection RO element 150*a*, a first reverse RO element 150*b*, and a second RO element 150*c*. The system 800 includes a feed stream source 114 configured to deliver a feed stream 112 to the FO element 110. The FO element includes a first side 115, second side 125, and FO membrane 130 separating the first side 115 from the second side 125. The feed stream 112 is concentrated in the FO element to produce concentrated feed stream 116 as disclosed herein. The system 800 includes a draw stream source 124 configured to provide draw stream 122 into the FO element 110. As the draw stream 122 travels through the FO element 110, the draw stream 122 is diluted to form diluted draw stream 126. Diluted draw stream 126 is directed through a plurality of draw stream regeneration apparatuses via one or more downstream draw components 128.

The diluted draw stream is directed through a low rejection RO element 150*a*. The diluted draw stream 126 is processed in the low rejection RO element 150*a* to produce a first RO concentrate 154*a* having a higher concentration of impermeable solutes than the diluted draw stream 126; and to produce a first RO permeate 156*a*. The first RO concentrate 154*a* includes water, impermeable solute(s), and at least some permeable solutes (e.g., alcohol). In some embodiments, the concentration of alcohol in the first RO permeate 156*a* a may be similar to the concentration of alcohol in the diluted draw stream 126 and the first RO concentrate 154*a*. In some embodiments, the concentration of impermeable solutes may be higher in the first RO concentrate 154*a* than in the diluted draw stream 126. The first RO permeate 156*a* may include water, at least some alcohol, and at least some impermeable solute(s). The first RO permeate 156*a* may have a lower concentration of alcohol and/or impermeable solute(s) than the diluted draw stream 126. The first RO concentrate 154*a* is directed back to the draw stream source 124 and the first RO permeate is directed to second RO element 150*b* via the one or more downstream draw components 128*b* (e.g., one or more conduits and a pump).

The first RO permeate 156*a* is processed in the first RO element 150*b* by RO to produce a second RO concentrate 154*b* and a second RO permeate 156*b*. The second RO concentrate 154*b* may have a higher concentration of impermeable solutes than the first RO permeate 156*a*. The second RO concentrate is directed to the draw stream source 124 via one or more conduits, valves, pumps, etc. The second RO permeate 156*b* primarily includes water, at least some alcohol, and at least some impermeable solute(s). The second RO permeate 156*b* may have a lower concentration of alcohol and impermeable solute(s) than the first RO permeate 156*a*. The second RO permeate 156*b* is directed to a second RO element 150*c* via one or more downstream draw component 128*c* (e.g., one or more conduits, pumps, valves, etc.)

The second RO permeate 156*b* is processed in the second RO element 150*c* by RO to produce a third RO concentrate 154*c* and a third RO permeate 156*c*. The third RO concentrate 154*c* may have a higher concentration of alcohol and/or impermeable solutes than the second RO permeate 156*b*. In some embodiments, the third RO concentrate 154*c* includes one or more concentrated permeable solutes such as alcohol (e.g., ethanol). The third RO concentrate 154*c* is directed to the draw stream source 124 via one or more conduits, valves, pumps, etc. The third RO permeate 156*c* primarily includes one or more of water, at least some alcohol, or at least some impermeable solute(s). The third RO permeate 156*c* may have a lower concentration of alcohol (and other permeable solutes) and impermeable solute(s) than the second RO permeate 156*b*. In some embodiments, the third RO permeate 156*c* can include substantially pure water. The third RO permeate 156*c* is directed to out of the system 800 or may be further processed by additional downstream components (not shown), including conduits, pumps compressors, distillation apparatuses, RO elements, etc.

The third RO concentrate 154*c* can be combined with the second RO concentrate 154*b* at a point intermediate to the draw stream source 124 and the first and second RO elements 150*b* and 150*c*. The combined second and third RO concentrates 154*b* and 154*c* can be combined with the first RO concentrate 154*a* to reform (e.g., form a reconstituted or regenerated) draw stream 122. The combined second and third RO concentrates 154*b* and 154*c* can be combined with the first RO concentrate 154*a* at a point intermediate to the draw stream source 124 and the low rejection RO element 150*a*.

In some embodiments, the order of any of the RO elements may vary. For example, diluted draw stream 126 can be concentrated by a first RO element followed by a low rejection RO element and the second RO element. In some examples, the low rejection RO and the reverse osmosis may be staged in any order. In some embodiments, the systems herein can be arranged to recover one or more specific impermeable or permeable solutes prior to recovering on or more additional permeable or impermeable solutes. For example, regeneration apparatuses can be arranged to recover glycerol from a diluted draw stream prior to recovering ethanol therefrom.

In some examples, an alcoholic beverage feed solution (e.g., beer) may be pressurized by a pump to form low-pressure feed stream 112 (e.g., about 5% ABW at 12 gpm). The FO element 110 receives low-pressure feed stream 112 and dispenses concentrated feed stream 116 (e.g., 30% ABW at 2 gpm). Draw solution (e.g., 30% ABW) may be pressurized by a pump forming low-pressure draw stream 122. The draw solution may be a mixture of water, ethanol, and impermeable solute(s). FO element 110 may receive low-pressure draw stream 122 and dispense diluted draw stream 126. A pump may receive diluted draw stream 126 and produce high-pressure diluted draw stream 126 (e.g., about 500 to about 1000 psi). The low rejection RO element 150*a* receives the high-pressure draw stream 126 and dispenses the first RO concentrate 154*a* primarily including impermeable solute(s) at a higher concentration than in the diluted draw stream 126, at least some water, and may include at least some ethanol. The low rejection RO element 150*a* also dispenses the first RO permeate 156*a* primarily including water, ethanol, and impermeable solute(s) having a concentration lower than the concentration of impermeable solute(s) in the diluted draw stream 126 and the RO concentrate 154*a*.

The first RO permeate can be routed through a pump to produce high pressure in the first RO permeate 156*a*. A first RO element 150*b* (as differentiated from to the low rejection RO element) receives the high pressure first RO permeate 156*b* and produces a second RO concentrate 154*b* and a second RO permeate 156*b*. The second RO concentrate 154*b* may include at least some water, impermeable solute(s) at a concentration higher than in first RO permeate 156*a*, and at least some ethanol. The second RO permeate 156*b* may include a mixture of alcohol (e.g., ethanol) in water at a concentration lower than the first RO permeate 156*a*.

The second RO permeate 156*b* can be routed through a pump to produce high pressure (e.g., 800 psi) in the second RO permeate 156*b*. A second RO element 150*c* is configured to receive the high pressure second RO permeate 156*b* and produce third RO permeate 156*c* and third RO concentrate 154*c*. The third RO permeate 156*c* may include highly diluted ethanol in water. The third RO concentrate 154*c* may include concentrated ethanol (and/or impermeable solutes) in water at concentration higher than in second RO permeate 156*b*. The third RO concentrate 154*c* may be plumbed to combine with second RO concentrate **154*b* to form a pre-draw stream. The pre-draw stream may be plumbed to combine with first RO concentrate 154*a* to reform draw stream 122**. Additional RO stages may be added to increase the total ethanol (other permeable solute or impermeable solute) recovery as needed.

In some embodiments, one or more permeable solutes and one or more substantially impermeable solutes can be recovered or regenerated from a diluted draw solution separately (e.g., a predominant recovered permeable solute is a specific species) in a system. For example, a first permeable solute may be recovered in a first recovery apparatus (or array thereof) and at least a second impermeable solute may be recovered by at least a second recovery apparatus (or array thereof). After separately recovering the permeable solutes, at least some of the first and second solutes can be admixed with or recombined to form a recovered/regenerated draw solution.

Figure 9:
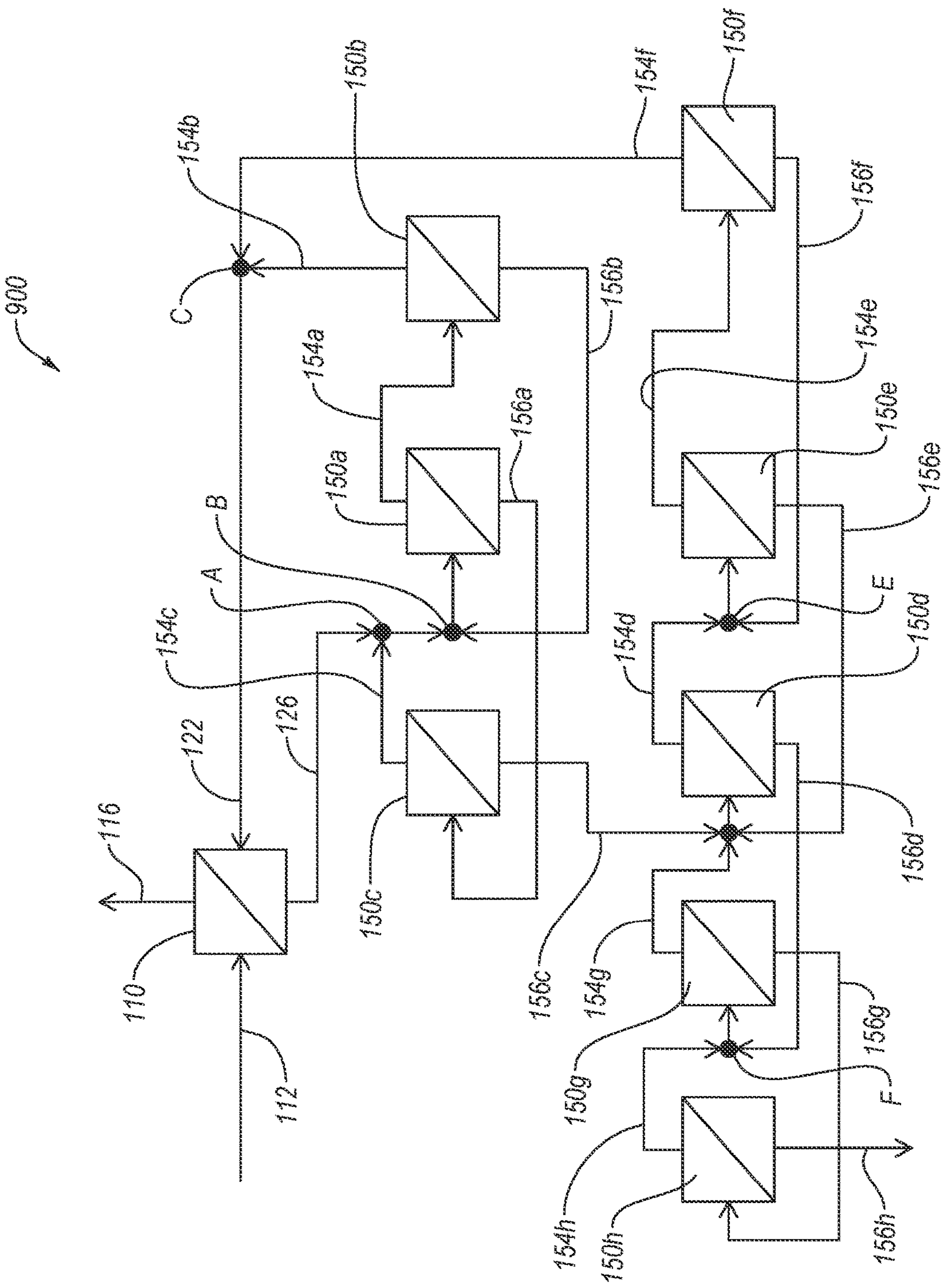
FIG. 9 is a block diagram of a forward osmosis system for dewatering a solution and configured for recovery of a draw solution via multiple reverse osmosis operations, according to examples described herein.

FIG. 9 is a block diagram of an FO system 900 for dewatering a solution and recovery of a draw solution via multiple reverse osmosis operations. The system 900 includes a first array of RO elements arranged to recover a first impermeable solute (e.g., glycerol) from a diluted draw solution and a second array of RO elements arranged to recover a first permeable solute (e.g., ethanol) from the diluted draw solution. The arrays of RO elements can be arranged in parallel, in series, or any combination(s) thereof.

The system 900 includes an FO element 110 as disclosed herein. The feed stream 112 and a draw stream 122 are fed into the FO element 110, such as in countercurrent operation as shown. The draw stream 122 includes a higher concentration of one or more permeable solutes than the feed stream 112 and/or concentrated feed stream 116, and may include additional impermeable solutes (such as in solutions where the sum of the permeable and impermeable solutes collectively provide a greater osmotic pressure in the draw stream than the solute(s) in the feed stream). The FO element 110 outputs a concentrated feed stream 116 having a higher concentration of one or more permeable solutes (e.g., ethanol) than the feed stream 112. The FO element 110 also outputs a diluted draw stream 126 having a lower concentration of at least one species of the one or more permeable solutes (e.g., ethanol) and of the one or more impermeable solutes (e.g. glycerol) than the draw stream 122 due to at least some solvent (e.g., water) crossing the FO membrane. The total amounts of permeable solutes and impermeable solutes in the draw stream may remain essentially static (ignoring some negligible amounts of loss or gain) while the concentration(s) of each are lowered due to dilution by the solvent (water) crossing the FO membrane. The diluted draw stream 126 can be directed to one or more draw solution regeneration apparatuses each configured to regenerate (e.g., concentrate or recover) at least one draw solute from the diluted draw stream 126. The one or more draw solution regeneration apparatuses can include any of the RO elements, distillation apparatuses, or other regeneration apparatuses disclosed herein.

The one or more draw solution regeneration apparatuses may include a first plurality of RO elements **150*a*-150*c* and at least a second plurality of RO elements 150*d*-150*h*. The first plurality of RO elements may primarily separate a first solute (e.g., impermeable solute) such as glycerol from the diluted draw stream 126 (e.g., selectively isolate one or more major species while additionally isolating minor amounts of additional species), and the at least a second plurality of RO elements 150*d*-150*h* may primarily separate at least a second solute (e.g., permeable solute) such as ethanol from the diluted draw stream 126**. As the diluted draw solution (to be regenerated) passes through the array (e.g., series) of RO elements one or more solutes therein can be steadily concentrated until a desired concentration is reached.

In some examples, a first RO element **150*a* can be fluidly coupled to the FO element 110. The first RO element 150*a* can receive the diluted draw stream 126 and output an RO concentrate 154*a* and an RO permeate 156*a* (e.g., in a streams or batches). The first RO concentrate 154*a* can include a mixture of at least a first impermeable solute (e.g., a plurality of impermeable solutes) and a first permeable solute and water having a higher concentration of at least the first impermeable solute and/or other impermeable solutes than the diluted draw stream 126. The concentration of the first impermeable solute in the first RO permeate 156*a* may be lower than in the diluted draw stream 126 and/or the first RO concentrate 154*a*. The first RO concentrate 154*a* can be directed to a second RO element 150*b* and the first RO permeate can be directed to a third RO element 150*c***.

The second RO element **150*b* is fluidly coupled to the first RO element 150*a*. The first RO concentrate 154*a* is received by the second RO element 150*b* and is at least partially separated (e.g., filtered) therein. The second RO element 150*b* outputs a second RO concentrate 154*b* and a second RO permeate 156*b*. The second RO concentrate 154*b* can include a mixture of at least the first impermeable solute (e.g., a plurality of impermeable solutes) and the first permeable solute (e.g. alcohol) and water having a higher concentration of at least the first impermeable solute and/or other impermeable solutes and alcohol than the diluted draw stream 126 and the first RO concentrate 154*a*. The concentration of the first impermeable solute in the second RO permeate 156*b* may be lower than in one or more of the diluted draw stream 126, the first RO concentrate 154*a*, and/or the second RO concentrate 154*b*. The second RO concentrate 154*b* may include a greater amount of the first impermeable solute (e.g., glycerol) than any of the other RO concentrates in the system 900. The second RO concentrate 154*b* can be directed back to the FO element 110 (or a downstream apparatus intermediate the second RO element 150*b* and the FO element 110) and the second RO permeate can be directed back to the first RO element 150*a* (e.g., recycled therethrough). The second RO concentrate 154*b* can be combined with one or more additional solutions (e.g., additional concentrate streams) at a point C intermediate to the FO element 110**.

In some examples of the system 900, the second RO element **150*b* can be a low rejection RO membrane, which can be operated at a higher osmotic pressure than a standard RO membrane (e.g., membrane that is less permeable, having higher rejection rates than the low rejection RO membranes). The low rejection RO membrane can be operated at a high pressure which may concentrate the one or more impermeable solutes (e.g., glycerol) in the solution therein at a higher rate than in a standard RO system. In some examples, the second RO element 150*b* can include a plurality of RO elements (e.g., an array of RO elements arranged in series and/or in parallel) and the RO concentrate 154*a* may be cycled through each of the plurality of RO elements progressively concentrating at least the first impermeable solute therein upon each successive RO operation. In such examples, the plurality of RO elements in the position of the second RO element 150*b*** can include at least 2 RO elements, such as 20 to 100, 2 to 50, 5 to 40, 10 to 30, 2 to 20, 15 to 25, 30 to 50, 2 to 10, 3 to 8, 2 to 5, 3 to 6, or 5 to 10, more than 10, more than 20, more than 30, less than 50, less than 40, less than 30, less than 20, or less than 10 RO elements.

In some examples, the system 900 includes an additional, third RO element 150*c* to further remove at least the first impermeable solute from the diluted draw stream (as it is found after at least two RO operations). In such examples, the third RO element 150*c* can ensure that at least a major portion of one or more undesirable impermeable or permeable solutes (e.g., species of impermeable or permeable solutes that interfere with further regeneration or recovery of other solutes) are isolated or recovered from the in-process solution (e.g., solution being processed for recovery of further, different solutes) such that further regeneration/recovery of the draw solution progresses without interference therefrom. The third RO element 150*c* is fluidly coupled to the second RO element 150*b* and receives the second RO permeate 156*b* which is at least partially separated therein. The third RO element 150*c* outputs a third RO concentrate 154*c* and a third RO permeate 156*c*. The third RO concentrate 154*c* can include a mixture of at least the first impermeable solute (e.g., a plurality of impermeable solutes) and water having a higher concentration of at least the first impermeable solute (e.g., glycerol) and/or permeable solutes than the diluted draw stream 126, the diluted draw stream 126, or the first RO permeate 156*a*. In some embodiments, the third RO concentrate 154*c* can include a mixture of at least the first permeable solute and water having a concentration similar to the diluted draw stream 126 and the second RO permeate 156*b*. The third RO element 150*c* and operation can essentially to ensure that essentially no undesirable impermeable solutes are present when the third RO permeate 156*c* is further subjected to recovery of at least a first permeable solute (e.g., ethanol). The third RO concentrate 154*c* may be directed back to the first RO element 150*a* for further solute recovery therein (e.g., recycled therethrough). The third RO concentrate 154*c* can be combined with diluted draw stream 126 at point A (e.g., one or more of a valve, a pipeline, a tank, etc.) and the combined diluted draw stream 126 and third RO concentrate 154*c* can be further combined with the second RO permeate 156*b* at point B (e.g., one or more of a valve, a pipeline, a tank, etc.) prior to entering the first RO element 150*a*.

The concentration of the first impermeable solute in the third RO permeate 156*c* may be lower than in one or more of the diluted draw stream 126, the first RO concentrate 154*a*, and/or the second RO concentrate 154*b*, such as negligible amounts of the first impermeable solute (e.g., amounts that do not interfere with further recovery/regeneration operations). For example, the third RO permeate 156*c* can include less than about 2 wt % of the first impermeable solute, such as about 0.1 wt % to about 2 wt %, or greater than 0 wt % to about 1 wt % of the first impermeable solute. The concentration of at least the first permeable solute (e.g., ethanol) can be substantially constant throughout the RO elements 150*a*-150*c*. In some examples, the concentration of one or more permeable solutes (e.g., ethanol) can remain steady, such as by varying by less than 5 wt % between each RO element or operation, such as by less than about 3 wt %, less than about 2 wt %, or about 1 wt % to about 3 wt % between at least two of the RO elements 150*a*-150*c*.

The third RO permeate 156*c* can be directed through a second set of draw stream regeneration apparatuses. Each of the second set of draw stream regeneration apparatuses may recover (e.g., concentrate) at least the first permeable solute (e.g., ethanol) therefrom (e.g., regenerate at least a portion of the draw solution). For example, the third RO permeate 156*c* can be directed to a fourth RO element 150*d*, where one or more permeable solutes are recovered. The fourth RO element 150*d* can be fluidly coupled to the third RO element 150*c*.

The fourth RO element 150*d* outputs a fourth RO concentrate 154*d* and a fourth RO permeate 156*d*. The fourth RO concentrate 154*d* can include a mixture of at least the first permeable solute (e.g., a plurality of permeable solutes which can also include residual amounts of the impermeable solute(s)) and water having a higher concentration of at least the first permeable solute and/or other permeable solutes than the diluted draw stream 126 and the third RO permeate 156*c*. The concentration of the first permeable solute (e.g., ethanol) in the fourth RO permeate 156*d* may be lower than in fourth RO concentrate 154*d* or the third RO permeate 156*c*. The substantial lack of the first impermeable solute (e.g., glycerol) in the third RO permeate 156*c* may allow for a more straightforward recovery process for at least the first permeable solute (e.g., undesirable chemical interactions between the first permeable solute and the RO membrane and/or chemical components if the feed and draw solutions are absent). The fourth RO concentrate 154*d* may include a greater amount of at least the first permeable solute than the third RO permeate 156*c*. The fourth RO concentrate 154*d* can be directed to a fifth RO element 150*e* and the fourth RO permeate 156*d* can be directed to a seventh RO element 150*g*.

The fifth RO element 150*e* can be fluidly coupled to the fourth RO element 150*d* and can receive the RO concentrate 154*d* and at least partially separate (e.g., filter) at least some of the components therein. The fifth RO element 150*e* outputs a fifth RO concentrate 154*e* and a fifth RO permeate 156*e*. The fifth RO concentrate 154*e* can include a mixture of at least the first permeable solute (e.g., a plurality of permeable solutes that may include residual amounts of the first impermeable solute) and water having a higher concentration of at least the first permeable solute and/or other permeable solutes than the diluted draw stream 126, the fourth RO concentrate 154*d*, and the fourth RO permeate 156*d*. The concentration of the first permeable solute (e.g., ethanol) in the fifth RO permeate 156*e* may be lower than in fifth RO concentrate 154*e* or the fourth RO concentrate 154*d*. The fifth RO concentrate 154*e* can be directed to a sixth RO element 150*f* and the fifth RO permeate 156*e* can be directed back to the fourth RO element 150*d*.

In some examples, the fifth RO element 150*e* can include a plurality of RO elements (e.g., at least two RO elements arranged in parallel and/or in series) to progressively concentrate at least the first permeable solute (e.g., ethanol) to a desired concentration prior to reaching the sixth RO element 150*f*. In such examples, the plurality of RO elements in position of the fifth RO element 150*d* can include at least 2 RO elements, such as 2 to 100, 2 to 50, 5 to 40, 10 to 30, 2 to 20, 15 to 35, 20 to 40, 30 to 50, 35 to 45, 2 to 10, 3 to 8, 2 to 5, 3 to 6, or 5 to 10, more than 10, more than 20, more than 30, less than 50, less than 40, less than 30, less than 20, or less than 10 RO elements.

The output of the fifth RO element 150*e* is fluidly coupled to at least the sixth RO element 150*f* and the fourth RO element 150*d* (e.g., at least the second side of the fifth RO element 150*e* is fluidly coupled to feed the first side of the fourth RO element 150*d* to recycle the fifth RO permeate 156*e* through the fourth RO element 150*d*). The fifth RO permeate 156*e* can be combined with at least the third RO permeate 156*c* at a point D prior to the fourth RO element 150*d*.

The fifth RO concentrate 154*e* is received and at least partially separated by the sixth RO element 150*f*. The sixth RO element 150*f* outputs a sixth RO concentrate 154*f* and a sixth RO permeate 156*f*. The sixth RO concentrate 154*f* can include a mixture of at least the first permeable solute (e.g., a plurality of permeable solutes that may include residual amounts of the first impermeable solute) and water having a higher concentration of at least the first permeable solute and/or other permeable solutes than the diluted draw stream 126, the fifth RO concentrate 154*e*, the fifth RO permeate 156*e*, and the sixth RO permeate 156*f* The sixth RO concentrate 154*f* may include a greater concentration of at least the first permeable solute than any other concentrate or permeate in the system 900. The concentration of the first permeable solute (e.g., ethanol) in the sixth RO permeate 156*f* may be lower than in the sixth RO concentrate 154*f* or the fifth RO concentrate 154*e*. The sixth RO concentrate 154*f* can be directed back to the FO element 110 to at least partially reconstitute the draw stream 122 and the sixth RO permeate 156*f* can be directed back to the fifth RO element 150*e* (e.g., for further RO operations).

The sixth RO concentrate 154*f*, having the highest concentration of at least the first permeable solute (e.g., ethanol) in the system 900 can be combined with the third RO concentrate 154*c* having the highest concentration of at least the first impermeable solute (e.g., glycerol) in the system 900 at point C prior to the FO element 110. The combination of the two RO concentrates 154*c* and 154*f* can at least partially reconstitute (e.g., regenerate) the draw stream 122, such that the solute(s) concentration(s) (e.g., permeable and impermeable solutes) therein is near or identical to the concentration(s) in the draw stream 122 prior to FO treatment.

The sixth RO permeate 156*f* is directed back to the first side of the fifth RO element 150*e*, where it undergoes additional RO operation(s) to further remove the first permeable solute therefrom. The sixth RO permeate 156*f* can be combined with the fourth RO concentrate 154*d* at a point E prior to the fifth RO element 150*e*.

Returning to the fourth RO permeate 156*d* stream, the output of the second side of the fourth RO element 150*d* is fluidly coupled to the first side of the seventh RO element. The fourth RO permeate 156*d* enters the seventh RO element 150*g* where one or more components therein are separated. The seventh RO element 150*g* outputs a seventh RO concentrate 154*g* and a seventh RO permeate 156*g*. The seventh RO concentrate 154*g* can include a mixture of at least the first permeable solute and water having a higher concentration of at least the first permeable solute and/or other permeable solutes than an eighth RO concentrate 154*h* and eighth RO permeate 156*h* (and in some examples may be substantially equal (e.g., within about 1-2% ABW) to the concentration in the fourth RO permeate 156*d*). The concentration of the first permeable solute (e.g., ethanol) in the seventh RO permeate 156*g* may be lower than the concentration in fourth RO permeate 156*d* and/or the seventh RO concentrate 154*g*.

The seventh RO concentrate 154*g* can be directed back to the fourth RO element 150*d* for further RO operations and the seventh RO permeate 156*g* can be directed to an eighth RO element 150*g*. The seventh RO concentrate 154*g* can be combined with one or more of the third RO permeate 156*c* and the fifth RO permeate 156*e* at point D. The seventh RO permeate is directed to the eighth RO element 150*h*.

In some examples, the seventh RO element 150*g* can include a plurality of RO elements (e.g., at least two RO elements arranged in series and/or in parallel) to progressively concentrate at least the first permeable solute to a desired concentration prior to recycling back to the fourth RO element 150*d*. In such examples, the plurality of RO elements in position of the seventh RO element 150*g* can include at least 2 RO elements, such as 2 to 100, 2 to 50, 5 to 40, 10 to 30, 2 to 10, 3 to 8, 2 to 5, 3 to 6, or 5 to 10, more than 10, more than 20, more than 30, less than 50, or less than 10 RO elements.

The seventh RO concentrate 154*g* can be directed back to the fourth RO element 150*d* for further RO operations and the seventh RO permeate 156*g* can be directed to an eighth RO element 150*g*. The seventh RO concentrate 154*g* can be combined with one or more of the third RO permeate 156*c* and the fifth RO permeate 156*e* at point D. The seventh RO permeate is received at the eighth RO element 150*h* where one or more components therein are at least partially separated.

The eighth RO element 150*h* outputs an eighth RO concentrate 154*h* and an eighth RO permeate 156*h*. The eighth RO concentrate 154*h* can include a mixture of at least the first permeable solute and water having a higher concentration of at least the first permeable solute and/or other permeable solutes than the eighth RO permeate 156*h*. The concentration of the first permeable solute (e.g., ethanol) in the eighth RO permeate 156*g* may be lower than the concentration in seventh RO permeate 156*g* and/or the eighth RO concentrate 154*h*. In examples, the eighth RO permeate 156*h* may include the lowest concentration of one or both of the first impermeable solute and at least the first permeable solute in the system 900. For example, the eighth RO permeate can be free (excepting residual amounts of less than about 1 wt %) of one or more of the first impermeable solute and at least the first permeable solute. Accordingly, essentially all of the first RO permeate is removed from the third RO permeate 156*c* (derived from the diluted draw stream 126) entering the second set of regeneration apparatuses.

The eighth RO concentrate 154*h* can be directed back to the seventh RO element 150*g* for further RO operation(s). The eighth RO concentrate 154*h* can be combined with the fourth RO permeate 156*d* at a point F prior to the seventh RO element 150*g*. The eighth RO permeate 156*h* may be removed from the system 900 as it exits the eighth RO element 150*h*. For example, the eighth RO permeate 156*h* can be directed to a tank, pipe, wastewater repository, or further water treatment apparatuses, outside of the system 900.

Points A, B, C, D, E, F may include one or more of pipeline(s), valve(s), tank(s), mixing vessel(s) or apparatuses, pump(s), or other equipment configured to mix, control movement, and/or contain a liquid therein. While points A, B, C, D, E, F are described as positions in the system 900, points A, B, C, D, E, F can indicate an operation of combining the streams converging thereat.

Any of the RO elements in the system 900 can include any of the RO membranes disclosed herein, such as a standard RO membrane or a low rejection RO membrane. Accordingly, any of the RO elements in the system 900 can be operated at any of the pressures disclosed herein. The operations and regeneration apparatuses disclosed above can be carried out in different orders, such as recovering a first permeable solute prior to recovering a first impermeable solute. In some embodiments, a system can include at least a first set of draw regeneration apparatuses to recover a first permeable concentrate (or impermeable concentrate) and a second set of draw regeneration apparatuses to recover a second permeable concentrate (or impermeable concentrate). Draw recovery of one or more permeable concentrates or impermeable concentrates may be carried out in any order using the techniques and systems disclosed herein.

In some examples, the system 900 can dewater the feed stream 112 having a volume of about 900 liters and an ethanol content of about 7% ABW. The feed stream can be dewatered in the FO element 110 using the draw stream 122 having a volume of about 685 liters, an ethanol concentration (e.g., first permeable solute) of about 27.4% ABW and a glycerol concentration (e.g., first impermeable solute) of about 10 wt %. The resulting concentrated feed stream 116 includes a volume of about 335 liters and an ethanol content of about 18.8% ABW. The resulting diluted draw stream 126 can include a volume of about 1250 liters, a glycerol concentration of about 5.5 wt %, and an ethanol concentration of about 15 wt %.

The diluted draw stream 126 is combined with the third RO permeate 156*c* and second RO permeate 156*b* prior to the first RO element 150*a*. The combined flow into the first RO element 150*a* includes a volume of about 2145 liters having an ethanol concentration of about 17% ABW and glycerol concentration of about 5 wt %. The first RO element 150*a* outputs a first RO concentrate 154*a* having a volume of about 750 liters, an ethanol concentration of about 19% ABW and a glycerol content of about 12 wt %. The first RO element 150*a* outputs the first RO permeate 156*a* having a volume of about 1395 liters, ethanol content of about 16% ABW, and glycerol content of about 2 wt %. In some examples, the first RO element 150*a* can include an array of RO elements, such as at least 2 RO elements, about 2 to about 40, or about 2 to 5 RO elements.

The first RO concentrate 154*a* is directed to the second RO element 150*b*, where the concentrate is further processed and the first RO permeate 156*a* is directed to the third RO element 150*c* for further processing. The second RO element 150*b* is configured as a low rejection RO element (e.g., operably at high pressures such as about 800 psi). The second RO element 150*b* outputs a second RO concentrate 154*b* having a volume of about 345 liters, an ethanol concentration of about 19% ABW, and a glycerol concentration of about 19 wt %. The second RO concentrate 154*b* is directed back to the FO element 110. The second RO element 150*b* outputs the second RO permeate 156*b* having a volume of about 405 liters, an ethanol concentration of about 19% ABW, and a glycerol content of about 5 wt %. The second RO permeate 156*b* is directed back to the first RO element 150*a* where it is combined with diluted draw stream 126 and third RO concentrate 154*c* for further RO processing.

The first RO permeate 156*a* is received in the third RO element 150*c* and separated into the third RO concentrate 154*c* and third RO permeate 156*c*. The third RO concentrate 154*c* includes a volume of about 905 liters, ethanol concentration of about 19% ABW, and glycerol concentration of about 4 wt %. The third RO concentrate is combined with the draw stream 126 and second RO permeate 156*b* at point A. The third RO permeate includes a volume of about 905 liters, an ethanol concentration of about 19% ABW and a glycerol concentration of about 3 wt % or less (e.g., less than about 1 wt %). At this point in processing, most of the glycerol is removed from the diluted draw stream 126 (as processed through RO elements 150*a*-150*c*) which may be further processed via RO to recover (e.g., concentrate) the ethanol therein.

The third RO permeate 156*c* is combined with the seventh RO concentrate 154*g* and the fifth RO permeate at point D prior to entering the fourth RO element 150*d* to form a combined solution. The combined solution includes a volume of about 3110 liters and ethanol concentration of about 14% ABW (with negligible amounts of glycerol therein). In the fourth RO element 150*d* the combined solution is separated into the fourth RO concentrate 154*d* and fourth RO permeate 156*d*. The fourth RO concentrate 154*d* has a volume of about 1385 liters and ethanol content of about 20% ABW. The fourth RO concentrate 154*d* is directed to the fifth RO element 150*e*, where it is combined with the sixth RO permeate 156*f* prior to reaching the fifth RO element 150*e*. The fourth RO permeate 156*d* has a volume of about 1725 liters and ethanol content of about 10% ABW. The fourth RO permeate 156*d* is directed to the seventh RO element 150*g* where it is combined with the eighth RO concentrate 154*h* prior to reaching the eighth RO element 150*h*.

The volume of solution of the combination of the fourth RO concentrate 154*d* and the sixth RO permeate 156*f* is about 1720 liters and the ethanol content is about 19% ABW. In the fifth RO element 150*e*, the solution is separated into the fifth RO concentrate 154*e* having a volume of about 675 liters and ethanol concentration of about 32% ABW, and the fifth RO permeate 156*e* having a volume of about 1045 liters and ethanol concentration of about 15% ABW. The fifth RO concentrate 154*e* is directed to the sixth RO element 150*f* and the fifth RO permeate 156*e* is directed to the fourth RO element 150*d* for combination with additional streams as described above. In some examples, the fifth RO element 150*e* can include an array of RO elements, such as about 2 to 7 RO elements.

The sixth RO element 150*f* receives the fifth RO concentrate 154*e* and separates it into the sixth RO concentrate 154*f* and the sixth RO permeate 156*f*. The sixth RO concentrate 154*f* has a volume of about 335 liters and ethanol concentration of about 37% ABW. At this point the ethanol concentration may be at its highest point in the system. The sixth RO permeate 156*f* includes a volume of about 335 liters and ethanol concentration of about 27% ABW. The sixth RO concentrate 154*f* is directed back to the FO element 110 where it is combined with the second RO concentrate 154*b* at point C prior to the FO element 110 to at least partially reform the draw stream 122. The sixth RO permeate 156*f* is directed back to the fifth RO element 150*e* where it is combined with the fourth RO concentrate 154*d* prior to the fifth RO element 150*d*.

Returning to the fourth RO permeate 156*d*, the combination of the eighth RO concentrate 154*h* and the fourth RO permeate 156*d* having a volume of about 2190 liters and ethanol concentration of about 8% ABW is separated in the seventh RO element 150*g*. The seventh RO element 150*g* outputs the seventh RO concentrate 154*g* and the seventh RO permeate 156*g*. The seventh RO concentrate 154*g* includes a volume of about 845 liters and an ethanol concentration of about 9% ABW. The seventh RO permeate 156*g* includes a volume of about 1035 liters and ethanol concentration of about 3% ABW. In some examples, the seventh RO element 150*g* can include an array of RO elements, such as about 2 to 7 RO elements (e.g., in series, each producing a progressively more concentrated RO concentrate and progressively more diluted permeate; and/or in parallel, each producing a similarly concentrated RO concentrate and diluted permeate). The seventh RO concentrate 154*g* is directed to the fourth RO element 150*d* as disclosed above and the seventh RO permeate is directed to the eighth RO element 150*h*.

The eighth RO element 150*h* separates the seventh RO permeate 156*g* into the eighth RO concentrate 154*h* and the eighth RO permeate **156*h*. The eighth RO concentrate includes a volume of about 465 liters and an ethanol concentration of about 6% ABW. The eighth RO concentrate 154*h* is directed back to the seventh RO element 150*g* for further processing. The eighth RO permeate includes a volume of about 560 liters and an ethanol concentration less than about 1% ABW (about 0.6% ABW). The eighth RO permeate 156*h* is substantially free of both glycerol and ethanol from the draw stream 122. Accordingly, essentially all of the ethanol and glycerol are recycled to the draw stream 122, thereby reducing material costs. The eighth RO permeate 156*h* can be removed from the system 900**.

While ethanol and glycerol are used as the first permeable solute and first impermeable solute, respectively, in the above examples, it should be understood that any of the other permeable and/or impermeable solutes disclosed herein may be used alternatively or in addition to ethanol or glycerol, without limitation.

The volumes and concentrations disclosed in the above examples are merely some examples, variations of larger and smaller volumes and/or concentrations are considered. Volumes and concentrations can vary depending on the species of the permeable and/or impermeable solutes, desired final concentration of the permeable and/or impermeable solutes, number of RO elements, etc. Volumes can be scaled, or adjusted as needed. For example, the volumes noted above can be increased or decreased by a factor of about 0.1 or more, such as about 0.1 to about 1000, about 1 to about 100, about 5 to about 50, about 10 to about 25, about 1 to about 10, about 3 to about 15, or less than about 20.

The above examples may include one or more distillation apparatuses, more RO elements, less RO elements, one or more sets or combinations of any of the foregoing to remove or concentrate one or more permeable solutes from a diluted draw solution, or combinations of any of the foregoing. In some embodiments, the RO elements include an array of RO membranes that may be in arranged parallel or in series, or in any combination of parallel and series.

Block diagram of FIG. 9 is described as a system above and may also be considered as a block diagram of exemplary methods. Such methods can be accomplished in a continuous series of operations as described above or in a batch wise manner (e.g., each FO or RO element operation is carried out separately).

Any of the systems disclosed herein can be configured as a countercurrent system or a co-current system. The systems disclosed herein can be used to dewater (e.g., concentrate) solutions containing one or more permeable and/or impermeable solutes, such as alcoholic beverages. Solutions can be concentrated via one or more techniques disclosed below.

Figure 10:
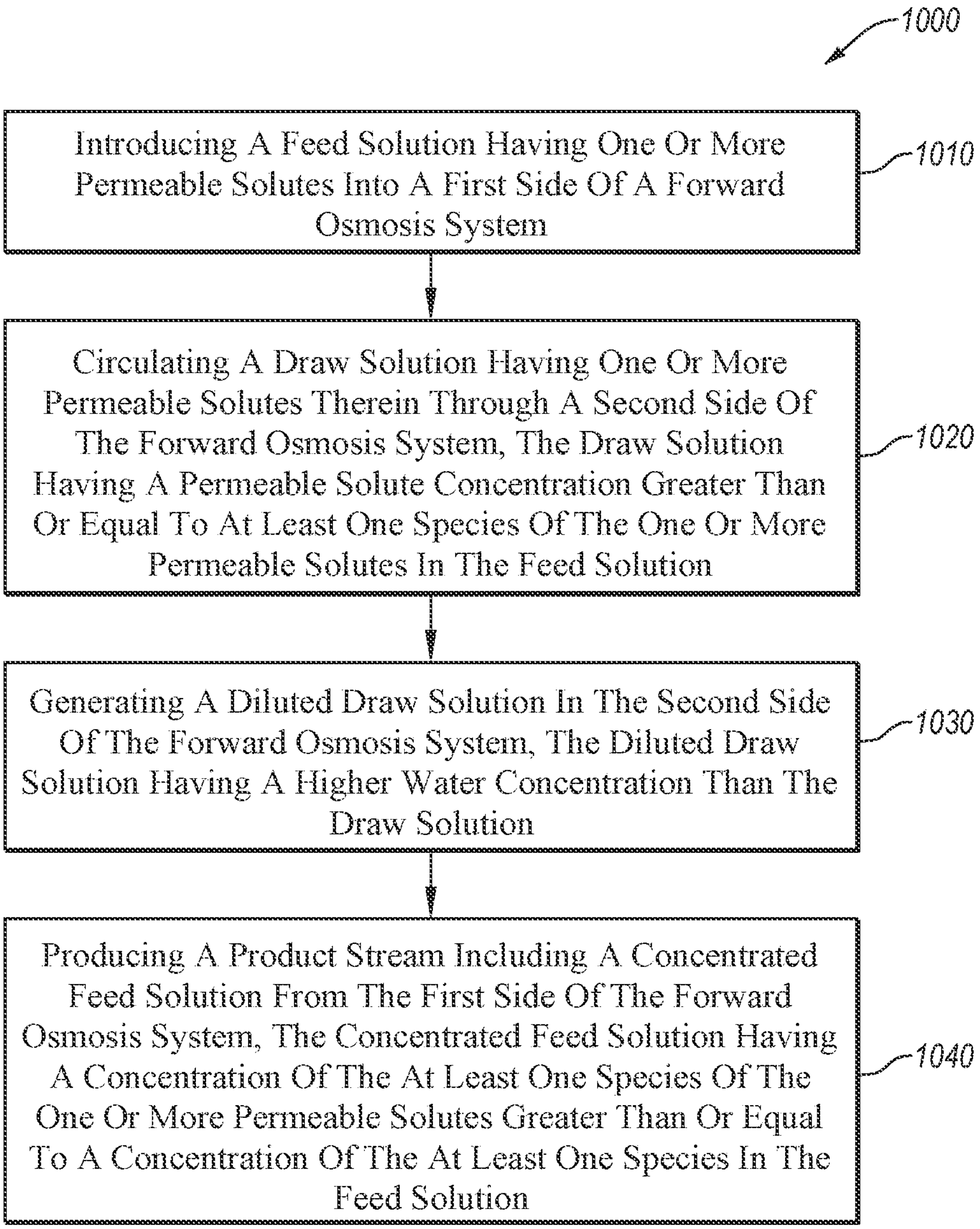
FIG. 10 is a flow diagram of a method for dewatering a solution, according to examples described herein.

FIG. 10 is a flow diagram of a method 1000 for dewatering a solution. The method 1000 includes an act 1010 of introducing a feed solution having one or more permeable solutes into a first side of a forward osmosis system; an act 1020 of circulating a draw solution having one or more permeable solutes therein through a second side of the forward osmosis system, the draw solution having a permeable solute concentration greater than or equal to at least one species of the one or more permeable solutes than the feed solution; an act 1030 of generating a diluted draw solution in the second side of the forward osmosis system, the diluted draw solution having a higher water concentration than the draw solution; and an act 1040 of producing a product stream including a concentrated feed solution from the first side of the forward osmosis system, the concentrated feed solution having a concentration of the at least one species of the one or more permeable solutes greater than or equal to a concentration of the at least one species in the feed solution.

The act 1010 of introducing a feed solution having one or more permeable solutes into a first side of a forward osmosis system can include introducing a solution having at least alcohol therein into a forward osmosis system. The feed solution can include an alcohol containing solution or a beverage containing alcohol such as malt beverages, beer, wine, distilled liquor or spirits; a flavor extract; a dye extract, or a fermentation broth (e.g., for ethanol production). The feed solution can include one or more permeable solutes therein (methanol, ethanol, isopropanol, ethylene glycol, lithium, protons, pH, lactic acid, acetic acid, citric acid, boron and boron oxides, hydroxides, ammonia, etc.), and optionally, one or more impermeable solutes such as sugars (e.g., glucose, fructose, glycerol, etc.), VOCs, dissolved salts (e.g., an inorganic salt such as sodium chloride), proteins (e.g., flavor or color enhancing proteins). In some embodiments, one or more impermeable solutes can include one or more sugar alcohols or dissolved derivatives thereof, such as sorbitol, mannitol, maltitol, glycerol, erythritol, etc., or hydrogenated starch hydrolysates. The feed solution may have a first concentration of the one or more permeable solutes (and/or impermeable solutes) effective to create a first osmotic pressure therein.

While in some embodiments, alcohol is described as a component of the feed solution separately, it should be understood that alcohol is a permeable solute of an alcohol containing solution (e.g., beverage) having less than 50% ABW, and for the purposes herein may be a permeable solute for solutions having greater than 50% ABW (e.g., include less than 50 wt % water). In some embodiments, prior to processing in the FO element(s), the feed solution can include an alcohol (e.g., ethanol) content of at least about 1% ABW, such as about 1% ABW to about 50% ABW, about 1% ABW to about 10 ABW, about 1% ABW to about 5 ABW, about 3% ABW to about 10 ABW, about 5% ABW to about 15 ABW, about 10% ABW to about 20 ABW, about 15% ABW to about 30 ABW, about 25% ABW to about 40 ABW, or less than about 50% ABW. In some embodiments, prior to processing in the FO element(s), the feed solution can include a permeable (and/or impermeable) solute(s) content or concentration (other than alcohol) of about 1 wt % (e.g., solute by weight) or more, such as about 1 wt % to about 50 wt %, about 5 wt % to about 40 wt %, about 10 wt % to about 35 wt %, about 15 wt % to about 30 wt %, about 5 wt % to about 20 wt %, less than about 30 wt %, less than about 40 wt %, about 1 wt % to about 20 wt %, about 20 wt % to about 40 wt %, or less than about 50 wt %. Individual solutes of multiple solute solutions (e.g., one or more permeable solutes and/or one or more impermeable solute containing solutions) can individually or collectively comprise any portion of the above noted wt % ranges.

Introducing a feed solution having one or more permeable solutes into a first side of a forward osmosis system can include introducing an alcohol containing solution into any of the FO systems or components thereof disclosed herein. For example, introducing a feed solution having one or more permeable solutes into a first side of a forward osmosis system can include using at least one FO element including at least one FO membrane having a polyamide support to separate the first side from the second side. Introducing a feed solution having one or more permeable solutes into a first side of a forward osmosis system can include using one or more of a pump, conduit, or valve. Introducing a feed solution having one or more permeable solutes into a first side of a forward osmosis system can include introducing the alcohol solution at a specific rate, such as about 1 gpm or more, or 1 gpm to about 30 gpm, about 3 gpm to about 20 gpm, about 5 gpm to about 15 gpm, or less than about 50 gpm. Introducing a feed solution having one or more permeable solutes into a first side of a forward osmosis system can include introducing the alcohol solution therein at a specific pressure, such as about 1 psi or higher, about 1 psi to about 100 psi, about 5 psi to about 50 psi, about 10 psi to about 20 psi, about 5 psi to about 10 psi, about 1 psi to about 50 psi, about 1 psi to about 5 psi, about 1 psi to about 10 psi, about 1 psi to about 15 psi, about 10 psi to about 20 psi, about 15 psi to about 50 psi, less than about 50 psi, or less than about 10 psi. The pressure can be supplied or regulated by one or more pumps.

Introducing a feed solution having one or more permeable solutes into a first side of a forward osmosis system can include circulating the feed solution through an FO element one time, more than one time, or through more than one FO element (e.g., a plurality of FO elements in parallel and/or series).

The act 1020 of circulating a draw solution having one or more permeable solutes therein through a second side of the forward osmosis system, the draw solution having a permeable solute concentration greater than or equal to at least one species of the one or more permeable solutes than the feed solution can include circulating a draw solution configured to allow/cause selective removal of one or more components of the feed solution. For example, the draw solution can include at least one permeable solute therein (e.g., methanol, ethanol, isopropanol, ethylene glycol, lithium, protons, pH, lactic acid, acetic acid, citric acid, boron and boron oxides, hydroxides, ammonia, etc.) in an amount such that the concentration differential between the first side and second side of the FO membrane on the permeable solute in the feed solution at least partially prevents the at least one permeable solute from crossing the FO membrane. If the concentration of the permeable solute in the feed solution is the same as the concentration of the same solute (and/or combination of solutes including one or more permeable solutes and/or one or more impermeable solutes) in the draw solution, and there is no water transfer from the feed stream to the draw stream (e.g., water flux less than about 0.1 LMH), the permeation of the permeable solute will be reduced. If the concentration of the permeable solute (and/or combination of solutes including one or more permeable solutes and/or one or more impermeable solutes) in the draw stream is less than the concentration in the feed stream, the permeable solute will transfer from the feed stream to the draw stream. If the concentration of the permeable solute in the feed solution is less than the concentration in the draw solution, the permeable solute will transfer from the draw stream to the feed stream. In some embodiments, a draw solution having a higher permeable solute content (and/or impermeable solute content, or combination thereof) of at least one species of the one or more permeable solutes (and/or impermeable solutes, or combination thereof) than the feed solution can be circulated through the second side. The concentration of permeable solute(s) (and/or combination of solutes including one or more permeable solutes and/or one or more impermeable solutes) in the draw stream can be used to control the permeation rate and therefore the concentration of the permeable solute in the feed stream concentrate. In some examples, water transfer from the feed stream to the draw stream (about 1 LMH or greater) will reduce the permeable solute concentration at the membrane surface, so an excess of permeable solute (and/or impermeable solutes) may be used (at least about 5% ABW more permeable solute in the draw stream for example). In some examples, the permeable solute(s) may hydrogen bond with water and the permeation may be related to water transfer, so an additional excess of permeable solute(s) (and/or impermeable solutes) may be used (at least about 10% for example). The amount of excess permeable solute(s) in the draw stream/solution may be experimentally determined by dewatering a feed stream/solution and measuring the concentration of the permeable solute in the feed stream concentrate as a function of concentration in the draw stream. The rate of transfer of the permeable solute may be dependent on one or more of the chemical species of the permeable solute(s), temperature, water flux, membrane materials and properties, turbulence and mixing at the membrane surface, pressure, flow rates, and the concentration of other species (counter ions and co-solvents). For example, increasing the draw stream flow rate with respect to the permeate stream flow rate while maintaining the draw stream permeable solute concentration will decrease the dilution of the draw stream and increase the net transfer of permeable solute from the feed stream to the draw stream.

In some embodiments, the draw solution can include at least the same concentration of or an excess of one or more permeable solutes (e.g., ethanol) in the feed solution. For example, the draw solution (either prior to or after cycling through the FO element) can include an alcohol content at least equal to the alcohol content of the feed solution, such as at least 1% ABW more than the feed solution, at least about 5% ABW more, at least about 10% ABW more, at least about 15% ABW more, about 1% ABW more to about 45% ABW more, about 5% ABW more to about 35% ABW more, about 10% ABW more to about 20% ABW more, about 1% ABW more to about 20% ABW more, about 5% ABW more to about 25% ABW more, or less than about 40% ABW more than the feed solution. It is to be understood, that % ABW is commensurate with wt % and can be used interchangeably. In some embodiments, circulating the draw solution can include using a draw solution having a permeable solute(s) content therein configured to maintain the permeable solute(s) content in the feed solution (stream). In some embodiments, circulating the draw solution can include using a draw solution having a content of one or more permeable solutes (e.g., species and amount) and/or impermeable solutes other than alcohol configured to maintain the content (e.g., species and amount) of the one or more permeable solutes in the feed solution. For example, the draw solution can include about 10 wt % more ethylene glycol than the feed solution, and during FO the ethylene glycol in the feed solution is retained therein due at least in part to the osmotic pressure (from the chemical potential) induced by the excess of ethylene glycol in the draw stream. In some embodiments, the draw stream has a lower amount of the one or more permeable solutes and/or impermeable solutes to induce the one or more permeable solutes in the feed solution to cross the FO membrane into the draw solution.

In some embodiments, in addition to alcohol, at least one more permeable or impermeable solute may be added to or present in the draw solution (e.g., draw stream) to generate additional osmotic pressure and driving force to dewater the feed solution (e.g., feed stream) to a desired concentration. The impermeable solute(s) may be implemented using at least one compound that may be a food safe additive that is soluble in water, capable of generating adequate osmotic pressure with a selected flux (e.g., at least about 1 liters/$m^2$/h (LMH)), well-rejected (non-permeable or substantially impermeable) by FO, RO or NF membranes to reduce draw loss into the feed and NF or RO permeate, or combinations thereof. The at least one more impermeable solute may include one or more inorganic salts, for example sodium chloride, magnesium chloride, or magnesium sulfate. The at least one more impermeable solute may include one or more sugar alcohols, for example sorbitol, mannitol, maltitol, glycerol, erythritol, etc. In some embodiments, the at least one more impermeable solute may include one or more hydrogenated starch hydrolysates. In some embodiments, the at least one more impermeable solute may include one or more proteins. In some embodiments, the at least one more impermeable solute may include one or more VOCs. Identical ranges of excess amounts of impermeable solutes as those disclosed herein for alcohol contents in the draw solution can be used for dissolved sugars, salts, or any other solutes in the draw solution in any combination and/or ranges thereof.

Circulating a draw solution having one or more permeable solutes therein through a second side of the forward osmosis system, the draw solution having a permeable solute concentration greater than or equal to at least one species of the one or more permeable solutes in the feed solution can include circulating the draw solution through any of the FO systems or components thereof disclosed herein. Circulating a draw solution having one or more permeable solutes therein through a second side of the forward osmosis system, the draw solution having a permeable solute concentration greater than or equal to at least one species of the one or more permeable solutes in the feed solution can include circulating the draw solution in either a countercurrent configuration or a co-current configuration to the feed solution. Circulating a draw solution having one or more permeable solutes therein through a second side of the forward osmosis system, the draw solution having a permeable solute concentration greater than or equal to at least one species of the one or more permeable solutes than the feed solution can include circulating the draw solution into the FO element using one or more of a pump, a conduit, a valve, etc. Circulating a draw solution having one or more permeable solutes therein through a second side of the forward osmosis system, the draw solution having a permeable solute concentration greater than or equal to at least one species of the one or more permeable solutes than the feed solution can include circulating the draw solution at a specific pressure, such as at least about 1 psi, about 1 psi to about 100 psi, about 10 psi to about 50 psi, about 15 psi to about 100 psi, about 10 psi to about 25 psi, about 25 psi to about 50 psi, about 75 psi to about 100 psi, less than about 100 psi, about 1 psi to about 10 psi, about 1 psi to about 15 psi, about 10 psi to about 20 psi, about 15 psi to about 50 psi, less than about 50 psi, or less than about 10 psi. Circulating a draw solution having one or more permeable solutes therein through a second side of the forward osmosis system, the draw solution having a permeable solute concentration greater than or equal to at least one species of the one or more permeable solutes in the feed solution can include circulating a regenerated, reconstituted, or recirculated draw solution through the FO system.

The act 1030 of generating a diluted draw solution in the second side of the forward osmosis system, the diluted draw solution having a higher water concentration than the draw solution can include using an FO membrane in the FO element capable of allowing at least some water to cross from the first side to the second side of the FO element via the membrane. Generating a diluted draw solution in the second side of the forward osmosis system can include outputting the diluted draw solution to one or more downstream draw components, such as any of those disclosed herein (e.g., regeneration apparatus(es), pumps, tanks, conduits, valves, etc.). In some embodiments, generating a diluted draw solution includes removing at least some water from the alcohol solution while leaving at least some or all of the alcohol therein, via the FO membrane.

The act 1040 of producing a product stream including a concentrated feed solution from the first side of the forward osmosis system, the concentrated feed solution having a concentration of the at least one species of the one or more permeable solutes greater than or equal to a concentration of the at least one species in the feed solution can include producing a product stream (e.g., concentrated feed stream) having a higher concentration of one or more permeable solutes (e.g., alcohol) and/or lower concentration of water therein than the feed stream. For example, producing a product stream including a concentrated feed solution from the first side of the forward osmosis system, the concentrated feed solution having a concentration of the at least one species of the one or more permeable solutes greater than or equal to a concentration of the at least one species in the feed solution can include producing a product stream having at least about 5% ABW more alcohol therein than the feed stream, such as about 5% ABW to about 50% ABW more, about 10% ABW to about 40% ABW more, about 15% ABW to about 35% ABW more, or about 20% ABW to about 30% ABW more alcohol therein than the feed stream. Producing a product stream including a concentrated feed solution from the first side of the forward osmosis system, the concentrated feed solution having a concentration of the at least one species of the one or more permeable solutes greater than or equal to a concentration of the at least one species in the feed solution can include outputting the concentrated feed solution (stream) to one or more downstream product components, such as one or more conduits, pumps, valves, refrigerators, distribution apparatuses, storage mediums (e.g., storage tanks), point of sale packaging (e.g., packaged concentrated alcoholic beverages), or a delivery means, such as a truck, pipeline, tank, etc. In some embodiments, producing a product stream can include retaining at least some of the one or more permeable solutes (e.g., alcohol) and/or one or more impermeable solutes (e.g., sugars, etc.) in the feed stream.

In some embodiments, the method 1000 can further include maintaining the permeable solute (e.g., alcohol, ethylene glycol, etc.) content and/or impermeable solute content of the draw solution. For example, the method 1000 can further include regenerating the draw solution from the diluted draw solution. Regenerating the draw solution from the diluted draw solution can include reconstituting (e.g., regenerating the draw solution) via one or more of at least one distillation apparatus or at least one RO element (e.g., low rejection RO and/or standard RO), or at least one addition of permeable solute(s) (e.g., alcohol) and/or impermeable solutes (e.g., glycerol or fructose) from at least a second source into the diluted draw solution. In some embodiments, the method 1000 can further include producing a permeate stream or distillate from the diluted draw solution. In some embodiments, producing the permeate stream or distillate from the diluted draw solution can include producing the permeate stream via reverse osmosis or distillation. In some embodiments, the permeate stream or distillate includes substantially pure water.

In some embodiments, the feed stream permeable solute (s) content can be slightly higher than a target feed stream concentrate permeable solute(s) content (e.g., target %

ABW), accounting for concentration, to avoid distillation or the addition of permeable solute(s) (e.g., ethanol) to the draw solution or diluted draw stream. In some examples, the permeable solute(s) (e.g., ethanol) lost in the permeate (not retained in the feed stream concentrate) may be distilled and used as fuel.

In some embodiments, the feed solution may be introduced to the FO element (e.g., concentrated) at low temperatures (e.g., −5° C. to 15° C.) which may improve retention of VOCs and small molecules to preserve the nutrients and flavors of the feed stream concentrate. In some embodiments, the feed solution may be concentrated at ambient (e.g., 15° C. to 35° C.) or higher temperature (e.g., 35° C. to 80° C.) to improve rejection and reduce costs of cooling the feed solution or concentrate thereof. In some embodiments, a temperature gradient across the FO membrane (e.g., a colder first side, or hotter first side) may increase the efficiency of the FO membrane or reduce costs of cooling or heating the feed solution or concentrate thereof. In some embodiments, the feed solution may be concentrated at a temperature and draw composition where the ratio of water permeation to ethanol permeation is highest.

The methods disclosed herein can be employed to provide concentrated alcoholic beverages suitable for reconstitution (e.g., rehydration) by addition of water at a selected time. In an example, an alcoholic solution having about 5% ABW is introduced into an FO element as an initial feed solution (e.g., feed stream). The desired final concentration of the dewatered alcoholic solution in this example is 30% ABW (e.g., 6× concentration). The primary outputs of some systems and/or methods disclosed herein could include the concentrated feed stream having about 30% ABW, and permeate stream including nearly pure water stream (approximately <1% ABW). The concentrated feed stream (concentrated feed solution) may then be sold as a 30% ABW concentrate for dilution by the consumer (or retail outlet, etc.) to produce a 5% ABW product upon reconstitution. In some examples, the system may be operated to produce a concentrated product (e.g., feed stream) of 15% ABW to produce a 2.5% ABW product after dilution by a consumer. In some examples, the system may be operated to produce a reject stream of 2.5% ABW to produce a 0.4% ABW product after dilution. In some examples, the system may be operated to produce a concentrated feed stream of any % ABW product. In some embodiments, the methods herein can be used to concentrate an alcoholic solution by 2× or more over the initial concentration of alcohol therein, such as about 2× to about 10×, about 3× to about 8×, about 4× to about 6×, about 2× to about 5×, more than about 5×, or less than about 10×.

In some embodiments, the method 1000 can include reconstituting the concentrated feed solution, such as by adding an amount of water corresponding to the level of concentration of the concentrated feed solution. For example, a concentrated feed solution having a 5× concentration of alcohol and other solutes therein can be diluted by combining about 5× the weight of the concentrated feed solution in water, with the concentrated feed solution.

Figure 11:
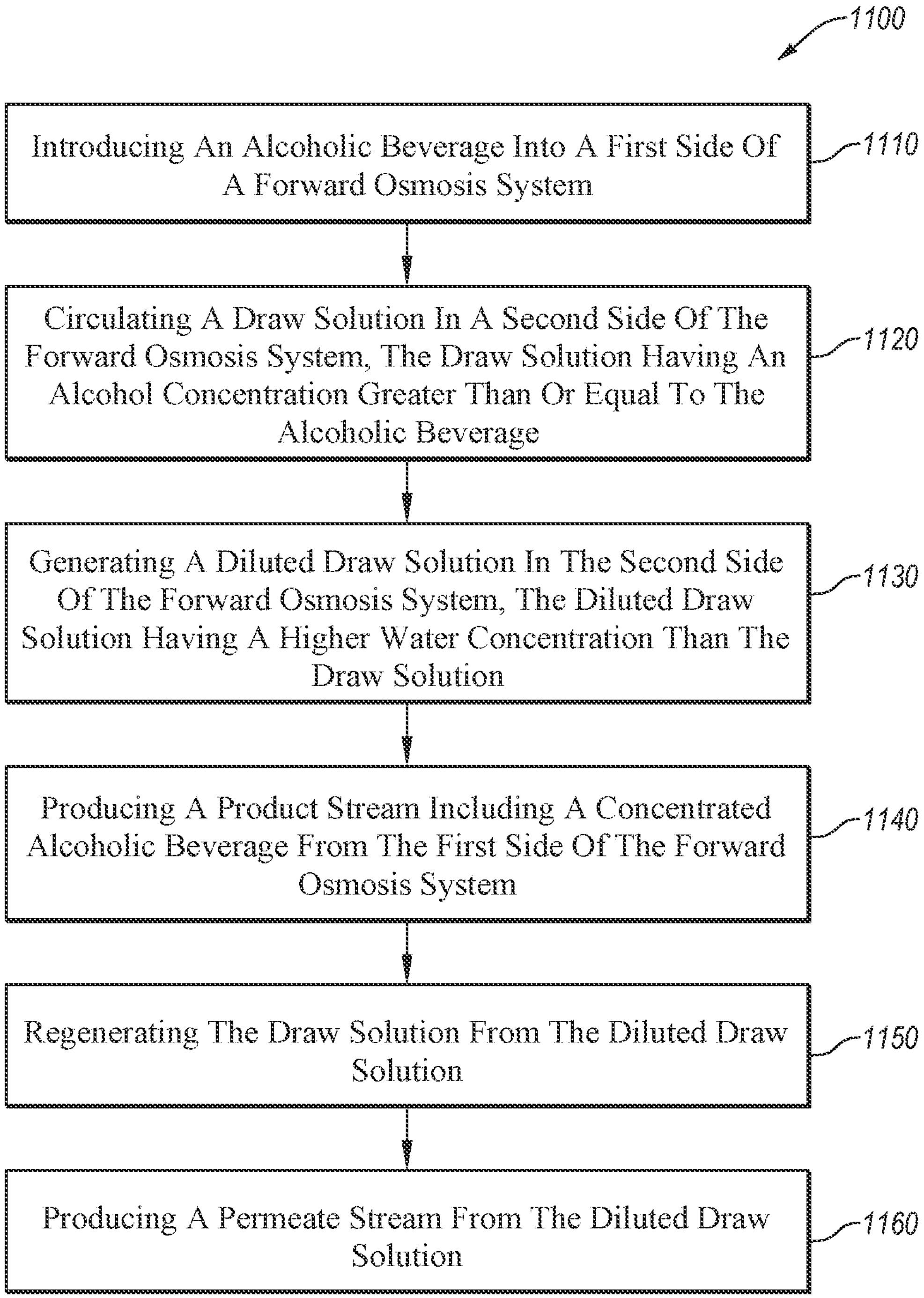
FIG. 11 is a flow diagram of a method for dewatering an alcoholic solution via forward osmosis, according to examples described herein.

FIG. 11 is a flow diagram of a method 1100 for dewatering an alcoholic solution using forward osmosis. The method 1100 includes an act 1110 of introducing an alcoholic beverage into a first side of a forward osmosis system; an act 1120 of circulating a draw solution in a second side of the forward osmosis system, the draw solution having an alcohol concentration greater than or equal to the alcoholic beverage; an act 1130 of generating a diluted draw solution in the second side of the forward osmosis system, the diluted draw solution having a higher water concentration than the draw solution; an act 1140 of producing a product stream including a concentrated alcoholic beverage from the first side of the forward osmosis system; an act 1050 of regenerating the draw solution from the diluted draw solution; and an act 1050 of producing a permeate stream from the diluted draw solution.

The act 1110 of introducing an alcoholic beverage into a first side of a forward osmosis system can include introducing one or more of beer, wine, distilled spirits (liquor), a malt beverage, any other alcoholic solution, or combinations thereof into the first side of an FO system. The act 1110 of introducing an alcoholic beverage into a first side of a FO system can be similar or identical to the act 1010 described above in one or more aspects. For example, the act 1110 can include introducing an alcoholic beverage into any of the FO systems disclosed herein. In some embodiments, introducing an alcoholic beverage into a first side of a forward osmosis system may include using a forward osmosis membrane having a polyamide support to separate the first side from the second side.

The act 1120 circulating a draw solution in a second side of the forward osmosis system, the draw solution having an alcohol content greater than or equal to the alcoholic beverage can include circulating a draw solution configured to allow/cause selective removal of one or more components of the feed solution. The act 1120 circulating a draw solution in a second side of the forward osmosis system, the draw solution having an alcohol content greater than or equal to the alcoholic beverage can be similar or identical to the act 1020 described above in one or more aspects. For example, circulating a draw solution in a second side of the forward osmosis system, the draw solution having an alcohol content greater than or equal to the alcoholic beverage can include circulating a draw solution having an excess of one or more solutes in the feed solution including an alcohol content that is at least 1% ABW more than the feed solution, at least about 5% ABW more, at least about 10% ABW more, at least about 15% ABW more, about 1% ABW more to about 45% ABW more, about 5% ABW more to about 35% ABW more, about 10% ABW more to about 20% ABW more, about 1% ABW more to about 20% ABW more, about 5% ABW more to about 25% ABW more, or less than about 40% ABW more than the feed solution.

The act 1130 of generating a diluted draw solution in the second side of the forward osmosis system, the diluted draw solution having a higher water concentration than the draw solution can including using an FO membrane in the FO element capable of allowing at least some water to cross from the first side to the second side of the FO element via the membrane. Generating a diluted draw solution in the second side of the forward osmosis system can include outputting the diluted draw solution to one or more downstream draw components, such as any of those disclosed herein (e.g., regeneration apparatus(es), pumps, tanks, conduits, valves, etc.). In some embodiments, generating a diluted draw solution includes removing at least some water from the alcoholic beverage while leaving at least some of the alcohol therein, via the FO membrane.

The act 1140 of producing a product stream including a concentrated alcoholic beverage from the first side of the forward osmosis system can include producing a product stream (e.g., concentrated feed stream) having a higher concentration of alcohol and/or lower concentration of water therein than the feed stream 112. For example, producing a product stream including a concentrated alcoholic beverage can include producing a product stream having at least about 5% ABW more alcohol therein than the feed stream, such as about 5% ABW to about 50% ABW more, about 10% ABW to about 40% ABW more, about 15% ABW to about 35% ABW more, or about 20% ABW to about 30% ABW more alcohol therein than the feed stream. Producing a product stream including a concentrated alcoholic beverage can include outputting the concentrated alcohol stream to one or more downstream product components, such as one or more conduits, pumps, valves, refrigerators, distribution apparatuses, storage mediums (e.g., storage tanks), point of sale packaging (e.g., packaged concentrated alcoholic beverages), or a delivery means, such as a truck, pipeline, tank, etc. The acts 1130 and 1140 can be carried out contemporaneously or simultaneously.

The act 1150 of regenerating the draw solution from the diluted draw solution can include directing the diluted draw solution through one or more regeneration apparatus, such as any of those disclosed herein. For example, regenerating the draw solution from the diluted draw solution can include directing the diluted draw solution through at least one RO element and/or at least one distillation apparatus. Regenerating the draw solution from the diluted draw solution can include reconstituting (e.g., regenerating) the draw solution via one or more of at least one distillation apparatus or at least one RO element (e.g., low rejection RO and/or standard RO), or at least one addition of alcohol from at least a second source into the diluted draw solution. In some embodiments, regenerating the draw solution includes distilling the diluted draw solution. In some embodiments, regenerating the draw solution includes performing reverse osmosis and distillation on the diluted draw solution. In some embodiments, regenerating the draw solution includes performing one or more of low-rejection reverse osmosis, reverse osmosis, or distillation on the diluted draw stream or a derivative thereof. In some embodiments, regenerating the draw solution includes cycling the diluted draw solution through a first reverse osmosis process followed by a second reverse osmosis process.

The act 1160 of producing a permeate stream from the diluted draw solution can include producing the permeate stream via reverse osmosis or distillation. In some embodiments, the permeate stream or distillate includes substantially pure water (e.g., <1% ABW). In some embodiments, producing a permeate stream from the diluted draw solution includes producing a substantially pure water permeate stream The method 1100 can further include recirculating the regenerated draw solution through the second side of the FO system. The method 1100 can include any acts and/or aspects thereof disclosed herein, such as with respect to method 1000.

In an embodiment, a method of dewatering a solution can include an act of introducing a feed solution having one or more permeable solutes into a first side of a forward osmosis system. The method of dewatering a solution can include an act circulating a draw solution having one or more permeable solutes and one or more impermeable solutes therein through a second side of the forward osmosis system. The method of dewatering a solution can include an act generating a diluted draw solution in the second side of the forward osmosis system, the diluted draw solution having a higher water concentration than the draw solution. The method of dewatering a solution can include an act of producing a product stream including a concentrated feed solution from the first side of the forward osmosis system, the concentrated feed solution having a desired concentration of the at least one species of the one or more permeable solutes; wherein a combined osmotic pressure of the one or more permeable solutes and the one or more impermeable solutes in the draw solution is greater than an osmotic pressure of the concentrated feed solution.

The one or more permeable solutes can includes any permeable solutes disclosed herein, such as ethanol, and the one or more impermeable solutes can include any of the impermeable solutes disclosed herein, such as glycerol. The feed solution may include any feed solution disclosed herein, such as beer, non-alcoholic beer, wine, malt beverage, distilled spirits, or combinations thereof. The at least one permeable solute in the feed stream can include any permeable solute(s) disclosed herein, such as an alcohol.

In some embodiments, the draw solution may have a combined concentration of the one or more permeable solutes and one or more impermeable solutes equal to or greater than a concentration of one or more permeable solutes in the feed solution, such as at least about 1 wt % greater, at least about 5 wt % greater, or at least 10 wt % greater. In some embodiments, the draw solution may have a combined concentration of the one or more permeable solutes and one or more impermeable solutes equal to or greater than a concentration of one or more permeable solutes in the concentrated feed solution, such as at least about 1 wt % greater, at least about 5 wt % greater, or at least 10 wt % greater. The combined concentration of the one or more permeable solutes and the one or more impermeable solutes in the draw solution can induce a combined osmotic pressure that is greater than an osmotic pressure of the concentrated feed solution or feed solution.

In some embodiments, the method may further include regenerating the draw solution from the diluted draw solution, such as by any technique or combination of techniques disclosed herein. For example, regenerating the draw solution from the diluted draw solution may include separating at least some of the one or more permeable solutes (e.g., ethanol) in the diluted draw stream from at least some of the impermeable solutes (e.g., glycerol) in the diluted draw stream. In some embodiments, regenerating the draw solution from the diluted draw solution may further include concentrating the at least some of the one or more permeable solutes (e.g., ethanol) or at least some of the impermeable solutes (e.g., glycerol), such as by RO operations and/or distillation(s).

The above described methods and systems can be used to form concentrated beer, wine, malted beverages, liquor, or other alcoholic solutions. The methods and systems can also include acts and components to reconstitute the concentrated beer, wine, malted beverages, liquor, or other alcoholic solutions via controlled addition of at least water thereto.

Other specific forms of examples described herein may be used without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A system for dewatering an alcoholic solution, the system comprising:

a forward osmosis element including at least one selectively permeable forward osmosis membrane separating a first side of the forward osmosis element from a second side of the forward osmosis element;

an alcohol solution in the first side, wherein the alcohol solution comprises ethanol, wherein ethanol is permeable across the forward osmosis membrane; and a draw solution in the second side, the draw solution having an alcohol concentration greater than the alcohol solution effective to cause the alcohol to remain in the alcohol solution.

2. The system of claim 1, further comprising:

an alcohol solution source operably coupled to the first side; and a draw solution source operably coupled to the second side.

3. The system of claim 1, further comprising an output conduit operably coupled to the first side, the output conduit configured to receive a concentrated alcohol solution from the first side that was produced by forward osmosis processing of the alcohol solution.

4. The system of claim 1, further comprising at least one regenerating apparatus operably coupled to the second side and configured to receive output therefrom.

5. The system of claim 4, further comprising a draw solution source operably coupled to the first side, wherein a product side of at least one regenerating apparatus is operably coupled to the draw solution source.

6. The system of claim 5, wherein the at least one regenerating apparatus includes one or more of at least one reverse osmosis element, a low-rejection reverse osmosis element, or a distillation apparatus.

7. The system of claim 1, further comprising a first reverse osmosis element configured to receive a diluted draw solution from the forward osmosis element.

8. The system of claim 7, further comprising at least a second reverse osmosis element being configured to receive an output of the first reverse osmosis element.

9. The system of claim 7, further comprising at least one distillation apparatus configured to receive an output of the first reverse osmosis element, the at least one distillation apparatus being operably coupled to a conduit in fluid communication with the first side of the forward osmosis element.

10. The system of claim 1, wherein the draw solution has a combined solute osmotic pressure greater than a combined solute osmotic pressure of the alcohol solution, the draw solution has a concentration of ethanol greater than a concentration of ethanol in the alcohol solution effective to cause the ethanol to remain in the feed solution.

11. A method for dewatering an alcoholic solution comprising:

introducing an alcohol solution into a first side of a forward osmosis element, wherein the alcohol solution comprises ethanol;

circulating a draw solution through a second side of the forward osmosis element, the draw solution has an alcohol concentration greater than the alcohol solution;

removing water from the alcohol solution to generate a diluted draw solution in the second side of the forward osmosis element via forward osmosis, the diluted draw solution having a higher water concentration than the draw solution;

producing a product stream including a concentrated alcohol solution from the first side of the forward osmosis element, wherein ethanol in the alcohol solution is retained in the alcohol solution.

12. The method of claim 11, wherein removing water from the alcohol solution includes retaining a net ethanol amount between the alcohol solution and the draw solution.

13. The method of claim 11, wherein producing a product stream includes producing a product stream with a combined solute osmotic pressure that is less than the combined permeable solute osmotic pressure of the draw solution, via a forward osmosis membrane.

14. The method of claim 11, further comprising:

regenerating the draw solution from the diluted draw solution output from the second side of the forward osmosis element.

15. The method of claim 11, further comprising:

producing a permeate stream from the diluted draw solution.

16. The method of claim 11, further comprising:

directing the diluted draw stream to a first side of a reverse osmosis (RO) element;

separating at least some permeable solutes from other permeable and/or impermeable solutes and at least some water to form an RO concentrate;

directing at least some of the RO concentrate to a draw stream source operably coupled to the second side of the forward osmosis element; and producing an RO permeate from a second side of the RO element.

17. The method of claim 16, further comprising:

combining the RO concentrate with at least alcohol to regenerate the draw stream.

18. The method of claim 16, further comprising:

distilling the RO permeate to produce a distillate stream; and directing the distillate stream to the draw stream source.

19. The method of claim 18, further comprising:

combining at least a portion of the distillate stream with at least a portion of the RO concentrate to form the draw stream.

20. The method of claim 11, wherein the draw solution further includes at least one impermeable solute.

* * * * *